US010474355B2

(12) United States Patent
Gummadidala et al.

(10) Patent No.: US 10,474,355 B2
(45) Date of Patent: Nov. 12, 2019

(54) INPUT PATTERN DETECTION OVER VIRTUAL KEYBOARD FOR CANDIDATE WORD IDENTIFICATION

(71) Applicant: Keypoint Technologies India Pvt. Ltd., Hyderabad (IN)

(72) Inventors: Shailaja Gummadidala, Hyderabad (IN); Prima Dona Kurian, Hyderabad (IN); Sandeep Yelubolu, Hyderabad (IN); Sumit Goswami, Hyderabad (IN); Sunil Motaparti, Hyderabad (IN)

(73) Assignee: Keypoint Technologies India Pvt. Ltd. (IN)

( * ) Notice: Subject to any disclaimer, the term of this patent is extended or adjusted under 35 U.S.C. 154(b) by 427 days.

(21) Appl. No.: 14/762,355

(22) PCT Filed: Jan. 20, 2014

(86) PCT No.: PCT/IN2014/000039
§ 371 (c)(1),
(2) Date: Jul. 21, 2015

(87) PCT Pub. No.: WO2014/111959
PCT Pub. Date: Jul. 24, 2014

(65) Prior Publication Data
US 2015/0355836 A1 Dec. 10, 2015

(30) Foreign Application Priority Data
Jan. 21, 2013 (IN) .............................. 260/CHE/2013

(51) Int. Cl.
*G06F 3/0488* (2013.01)
*G06F 3/023* (2006.01)
*G06F 17/27* (2006.01)

(52) U.S. Cl.
CPC .......... *G06F 3/04886* (2013.01); *G06F 3/023* (2013.01); *G06F 3/0237* (2013.01); *G06F 3/04883* (2013.01); *G06F 17/276* (2013.01)

(58) Field of Classification Search
CPC ...... G06F 3/023; G06F 3/0237; G06F 17/276; G06F 3/04883; G06F 3/04842; G06F 3/0482; G06F 3/04886
See application file for complete search history.

(56) References Cited

U.S. PATENT DOCUMENTS

| 4,650,927 | A | 3/1987 | James |
| 5,128,672 | A | 7/1992 | Kaehler |

(Continued)

FOREIGN PATENT DOCUMENTS

| CN | 1026630 C | 11/1994 |
| CN | 101122840 A | 2/2008 |

(Continued)

OTHER PUBLICATIONS

Arnott, J. L. et al, Probabalistic character disambiguation for reduced keyboards using small text samples, Augmentative and Alternative Communication, vol. 8, No. 3, 1992, pp. 215-223.

(Continued)

*Primary Examiner* — Kieu D Vu
*Assistant Examiner* — Roberto Borja
(74) *Attorney, Agent, or Firm* — Brinks Gilson & Lione

(57) ABSTRACT

The present invention relates to a computer-implemented method for inputting text into an electronic device (10). A virtual keyboard (30) having a plurality of keys (40) is displayed on a display screen (20) and one or more characters are associated with each key. An input pattern is generated by a user and the key(s) (40) positioned on or proximal to the input pattern are identified. The keys (40) in the virtual keyboard (30) are allocated to pre-defined groups (Continued)

(50A, 50B, 50C), such that each group comprises a plurality of said keys (40). The input pattern is encoded in dependence on the pre-defined groups in which each of said one or more identified keys (40) are arranged. A candidate word or words is identified to be input into the electronic device (10) based on the encoded input pattern. The present invention also relates to computer-implemented methods for identifying candidate words based on the correlation between input and candidate string lengths; and/or upper/lower input length thresholds; and/or the identification of valid/invalid string combinations. The present invention also relates to a corresponding system, such as a computational apparatus (10).

25 Claims, 7 Drawing Sheets

(56) References Cited

U.S. PATENT DOCUMENTS

| | | | |
|---|---|---|---|
| 5,479,536 A | 12/1995 | Comerford | |
| 5,574,482 A | 11/1996 | Niemeier | |
| 5,621,641 A | 4/1997 | Freeman | |
| 5,625,354 A | 4/1997 | Lerman | |
| 5,649,223 A | 7/1997 | Freeman | |
| 5,687,254 A * | 11/1997 | Poon | G06K 9/00335 |
| | | | 382/187 |
| 5,724,449 A | 3/1998 | Cornerford | |
| 5,748,512 A | 5/1998 | Vargas | |
| 5,911,485 A | 6/1999 | Rossmann | |
| 5,982,302 A | 11/1999 | Ure | |
| 5,999,895 A | 12/1999 | Forest | |
| 6,002,390 A | 12/1999 | Masui | |
| 6,002,862 A | 12/1999 | Takaike | |
| 6,005,549 A | 12/1999 | Forest | |
| 6,031,525 A | 2/2000 | Perlin | |
| 6,104,317 A | 8/2000 | Panagrossi | |
| 6,160,536 A | 12/2000 | Forest | |
| 6,286,064 B1 | 9/2001 | King et al. | |
| 6,292,179 B1 | 9/2001 | Lee | |
| 6,307,549 B1 | 10/2001 | King et al. | |
| 6,903,723 B1 | 6/2005 | Forest | |
| 7,098,896 B2 | 8/2006 | Kushler et al. | |
| 7,151,533 B2 | 12/2006 | Van Ieperen | |
| 7,251,367 B2 | 7/2007 | Zhai | |
| 7,382,358 B2 | 6/2008 | Kushler et al. | |
| 7,453,439 B1 | 11/2008 | Kushler et al. | |
| 7,542,029 B2 | 6/2009 | Kushler | |
| 7,706,616 B2 | 4/2010 | Kristensson et al. | |
| 8,212,788 B2 | 7/2012 | Lam | |
| 8,266,528 B1 | 9/2012 | Hayes | |
| 8,381,100 B1 | 2/2013 | Hayes | |
| 8,669,941 B2 | 3/2014 | Sharan et al. | |
| 2002/0052900 A1 | 5/2002 | Freeman | |
| 2002/0060699 A1 | 5/2002 | D'Agostini | |
| 2002/0101441 A1 | 8/2002 | SanGiovanni | |
| 2002/0102025 A1 * | 8/2002 | Wu | G06F 17/271 |
| | | | 382/229 |
| 2002/0135561 A1 | 9/2002 | Rojewski | |
| 2002/0180797 A1 | 12/2002 | Bachmann | |
| 2003/0018714 A1 | 1/2003 | Mikhailov et al. | |
| 2004/0021691 A1 | 2/2004 | Dostie et al. | |
| 2004/0120583 A1 * | 6/2004 | Zhai | G06K 9/222 |
| | | | 382/229 |
| 2004/0140956 A1 * | 7/2004 | Kushler | G06F 3/04883 |
| | | | 345/168 |
| 2004/0163032 A1 | 8/2004 | Guo | |
| 2005/0017954 A1 | 1/2005 | Kay et al. | |
| 2005/0190973 A1 | 9/2005 | Kristensson et al. | |
| 2005/0200609 A1 * | 9/2005 | Van der Hoeven | G06F 3/0233 |
| | | | 345/169 |
| 2005/0231520 A1 | 10/2005 | Forest | |
| 2006/0176283 A1 | 8/2006 | Suraqui | |
| 2006/0265648 A1 | 11/2006 | Rainisto | |
| 2007/0074131 A1 | 3/2007 | Assadollahi | |
| 2007/0216651 A1 | 9/2007 | Patel | |
| 2008/0030463 A1 | 2/2008 | Forest | |
| 2008/0072143 A1 | 3/2008 | Assadollahi | |
| 2008/0266263 A1 | 10/2008 | Motaparti et al. | |
| 2008/0310723 A1 | 12/2008 | Manu et al. | |
| 2009/0055732 A1 | 2/2009 | Motaparti et al. | |
| 2009/0174667 A1 | 7/2009 | Kocienda et al. | |
| 2009/0187846 A1 | 7/2009 | Paasovaara | |
| 2009/0306980 A1 | 12/2009 | Shin | |
| 2010/0017872 A1 | 1/2010 | Goertz et al. | |
| 2010/0114930 A1 | 5/2010 | Kalasapur et al. | |
| 2010/0225599 A1 | 9/2010 | Danielsson et al. | |
| 2010/0302163 A1 * | 12/2010 | Ghassabian | G06F 3/0237 |
| | | | 345/168 |
| 2011/0061017 A1 | 3/2011 | Ullrich et al. | |
| 2011/0063231 A1 * | 3/2011 | Jakobs | G06F 3/04883 |
| | | | 345/173 |
| 2011/0078563 A1 | 3/2011 | Archer | |
| 2011/0082686 A1 | 4/2011 | Suraqui | |
| 2011/0087961 A1 | 4/2011 | Fitusi | |
| 2011/0090151 A1 | 4/2011 | Huang et al. | |
| 2011/0119617 A1 | 5/2011 | Kristensson | |
| 2011/0122081 A1 | 5/2011 | Kushler | |
| 2011/0141027 A1 | 6/2011 | Ghassabian | |
| 2011/0193797 A1 * | 8/2011 | Unruh | G06F 3/0237 |
| | | | 345/173 |
| 2011/0201387 A1 | 8/2011 | Paek et al. | |
| 2012/0036469 A1 | 2/2012 | Suraqui | |
| 2012/0192094 A1 | 7/2012 | Goertz | |
| 2012/0197825 A1 | 8/2012 | Medlock et al. | |
| 2012/0303452 A1 | 11/2012 | Xue et al. | |
| 2013/0002556 A1 | 1/2013 | Griffin | |
| 2013/0006639 A1 | 1/2013 | Kristensson et al. | |
| 2013/0018954 A1 | 1/2013 | Cheng | |
| 2013/0041857 A1 | 2/2013 | Medlock et al. | |
| 2013/0046544 A1 * | 2/2013 | Kay | G06F 3/04883 |
| | | | 704/275 |
| 2013/0120266 A1 | 5/2013 | Griffin | |
| 2013/0241838 A1 | 9/2013 | Onishi | |
| 2013/0246329 A1 | 9/2013 | Pasquero | |
| 2013/0285916 A1 | 10/2013 | Griffin | |
| 2013/0325438 A1 | 12/2013 | Griffin | |
| 2014/0002363 A1 | 1/2014 | Griffin et al. | |
| 2014/0028603 A1 | 1/2014 | Xie et al. | |
| 2014/0063067 A1 | 3/2014 | Compton et al. | |

FOREIGN PATENT DOCUMENTS

| | | |
|---|---|---|
| CN | 101131619 A | 2/2008 |
| CN | 102360249 A | 2/2012 |
| CN | 102739873 | 10/2012 |
| EP | 0213377 A1 | 3/1987 |
| EP | 0565872 A2 | 10/1993 |
| EP | 0651315 A1 | 5/1995 |
| EP | 0660218 A1 | 6/1995 |
| EP | 0732646 A2 | 9/1996 |
| EP | 0842463 A1 | 5/1998 |
| EP | 1010057 A1 | 6/2000 |
| EP | 1246048 A1 | 10/2002 |
| EP | 1724692 A2 | 11/2006 |
| EP | 2077486 A1 | 7/2009 |
| EP | 2336852 A2 | 6/2011 |
| GB | 233117 A | 5/1925 |
| GB | 233297 A | 6/1925 |
| GB | 231418 A | 8/1925 |
| GB | 233734 A | 7/1926 |
| JP | 7059170 | 3/1995 |
| JP | 2007-316732 | 12/2007 |
| JP | 2008-508600 | 3/2008 |
| JP | 2009-146435 | 7/2009 |
| JP | 2009-283015 | 12/2009 |
| JP | 2012-113741 | 6/2012 |
| JP | 2013-003801 | 1/2013 |
| WO | WO 1995/021436 A1 | 8/1995 |
| WO | WO 1996/030822 A1 | 10/1996 |
| WO | WO 97/05541 A1 | 2/1997 |

(56) References Cited

FOREIGN PATENT DOCUMENTS

| WO | WO 1997/004580 A1 | 2/1997 | |
|---|---|---|---|
| WO | WO 1997/30386 A1 | 8/1997 | |
| WO | WO 98/33111 A1 | 7/1998 | |
| WO | WO 1999/050818 A1 | 10/1999 | |
| WO | WO 2000/035091 A1 | 6/2000 | |
| WO | WO 2000/039663 A1 | 7/2000 | |
| WO | WO 2000/057265 A1 | 9/2000 | |
| WO | WO 2000/074240 A1 | 12/2000 | |
| WO | WO 2001/011463 A2 | 2/2001 | |
| WO | WO 2001/042871 A1 | 6/2001 | |
| WO | WO 2001/059975 A2 | 8/2001 | |
| WO | WO 2002/033527 A2 | 4/2002 | |
| WO | WO 2002/037254 A1 | 5/2002 | |
| WO | WO 2002/076075 A1 | 9/2002 | |
| WO | WO 2002/095524 A2 | 11/2002 | |
| WO | WO 2005/036310 A2 | 4/2005 | |
| WO | WO 2005/093555 A2 | 10/2005 | |
| WO | WO 2006/100505 A2 | 9/2006 | |
| WO | WO 2006/100509 A2 | 9/2006 | |
| WO | WO 2008/157021 A2 | 12/2008 | |
| WO | WO 2009/005415 A1 | 1/2009 | |
| WO | WO 2010/041092 A1 | 4/2010 | |
| WO | WO 2010/086689 A1 | 8/2010 | |
| WO | WO 2010/112841 A1 | 10/2010 | |
| WO | WO 2011/042710 A1 | 4/2011 | |
| WO | WO 2011/107751 A2 | 9/2011 | |
| WO | WO 2012/042217 A1 | 4/2012 | |
| WO | WO 2012/139266 A1 | 10/2012 | |
| WO | WO-2012139266 A1 * | 10/2012 | ......... G06F 3/04883 |

OTHER PUBLICATIONS

King, M. T. et al., Just-Type—Efficient Communication with Eight Keys, in Proc. RESNA '95 Annual Conference, Vancouver, BC, Canada, Jun. 9-14, 1995, pp. 94-96.

Kristensson, P. et al., Shark2: a large vocabulary shorthand writing system for pen-based computers, in Proceedings of the 17th Annual ACM Symposium on User Interface Software and Technology (UIST 2004), ACM Press, 2004, pp. 43-52.

Kristensson, P., Design and evaluation of a shorthand aided soft keyboard, Final/Master's Thesis (D-Uppsats), Linkoping University, Sweden, ISRN LiU-LOGVET-D-0--02/07--SE, Monograph, Aug. 28, 2002, 158 pages.

Long, A. C. et al., Implications for a gesture design tool, CHI '99 Proceedings of the SIGCHI Conference on Human Factors in Computing Systems, 1999, pp. 40-47.

Mankoff, J. et al., Cirrin: a word-level unistroker keyboard for pen input, Georgia Institute of Technology, GVU Center, College of Computing, 1998, 2 pages.

Perlin, K., Quikwriting: continuous stylus-based text entry, UIST '98 Proceedings of the 11th Annual ACM Symposium on User Interface Software and Technology, 1998, pp. 215-216.

Swiffin, A. L. et al., Adaptive and predictive techniques in communication prosthesis, Adapative and Alternative Communications, vol. 3, No. 4, 1987, pp. 181-191.

U.S. Patent and Trademark Office, International Searching Authority, International Search Report and Written Opinion for International Application No. PCT/IN/00039, dated Jul. 14, 2015, 12 pages.

Zhai, S. et al., Movement model, hits distribution and learning in virtual keyboarding, CHI '02 Proceedings of the SIGCHI Conference on Human Factors in Computing Systems, 2002, pp. 17-24.

Zhai, S. et al., The metropolis keyboard—an exploration of quantitative techniques for virtual keyobard design, UIST '00 Proceedings of the 13th Annual ACM Symposium on User Interface Software and Technology, 2000, pp. 119-128.

"Dynamic Time Warping", Jan. 17, 2013; retrieved from the internet: URL:https://en.wikipedia.org/w/index.php?title=Dynamic_time_warping&oldid=533575934 [retrieved on Sep. 19, 2016], 3 pages.

Supplemental European Search Report for corresponding European application No. EP 14741152.4 dated Sep. 30, 2016.

Extended European Search Report for corresponding European application No. EP 14763892.8 dated Sep. 29, 2016.

U.S. Patent and Trademark Office, Office Action for U.S. Appl. No. 14/157,826 dated Oct. 5, 2016, 11 pages.

Translation of Japanese Office Action for Application No. 2014-006905 dated Oct. 3, 2017.

EPO Office Action for Application No. 14 741 152.4-1216 dated May 2, 2018.

* cited by examiner

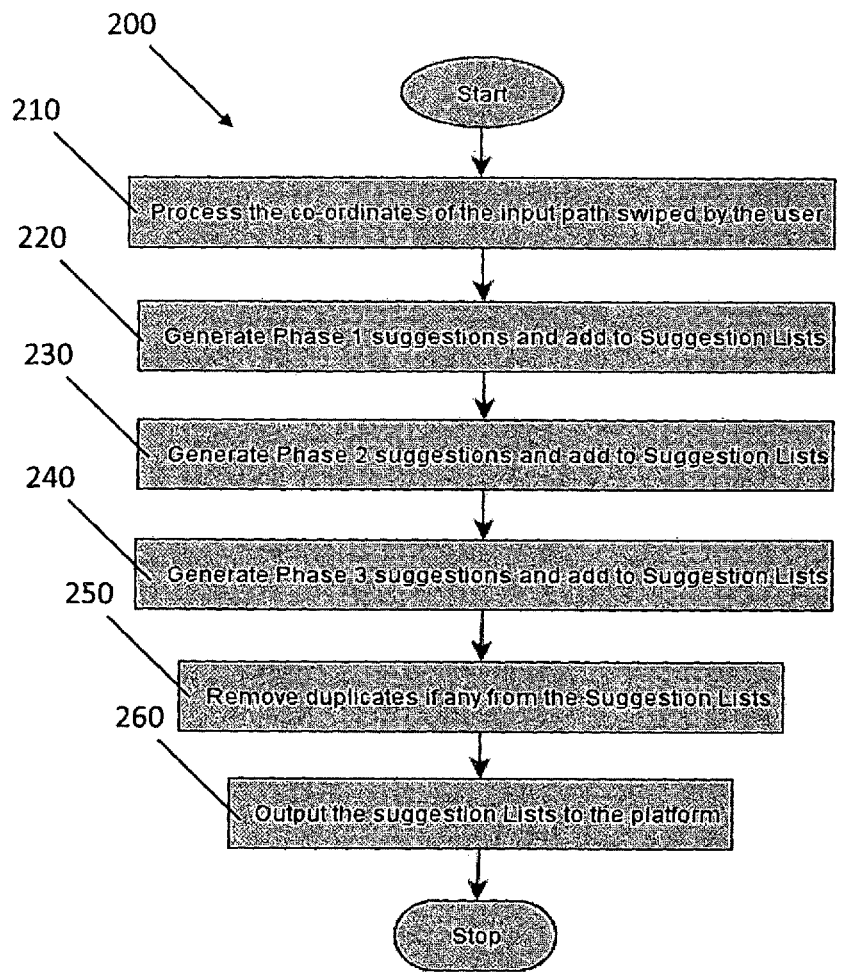
Figure 3: High level Steps

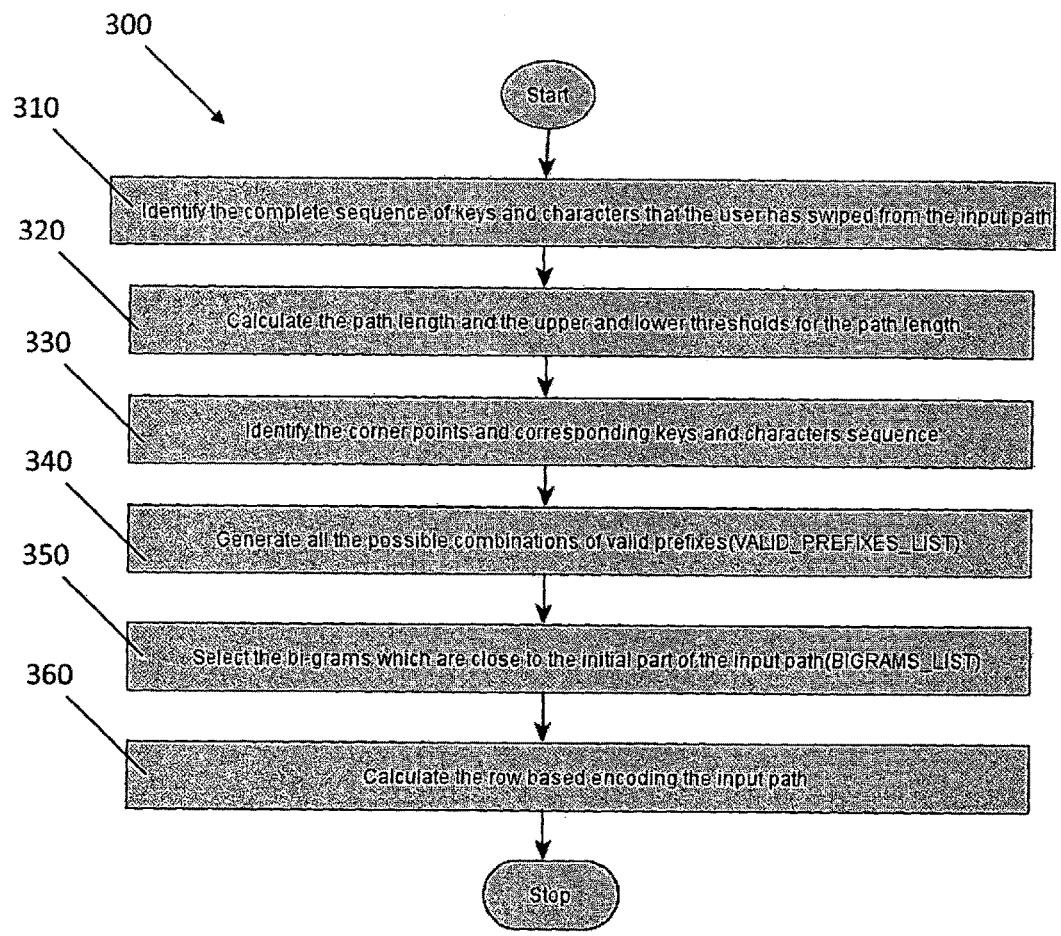
Figure 4: Processing the input path

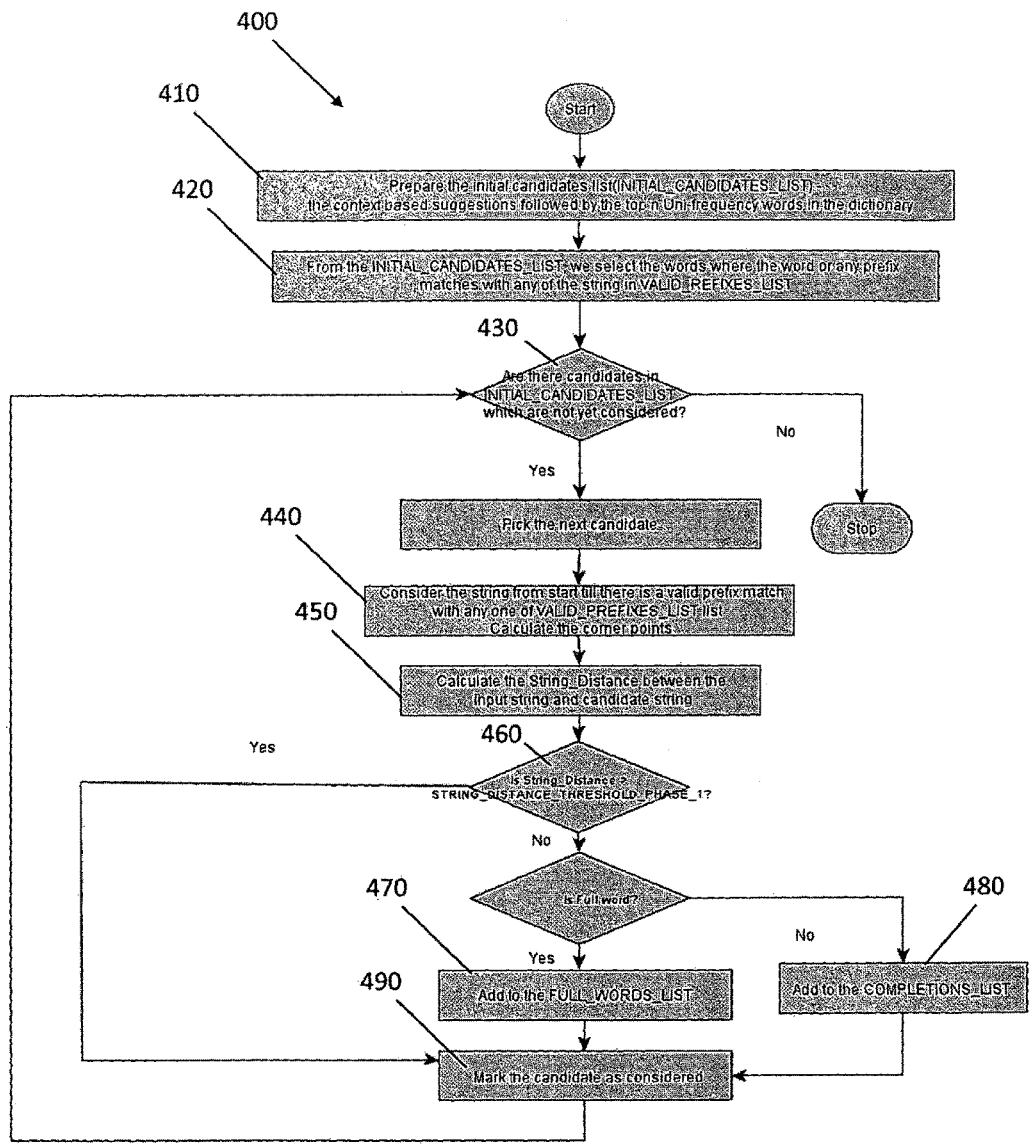
Figure 5: Phase 1 Suggestions

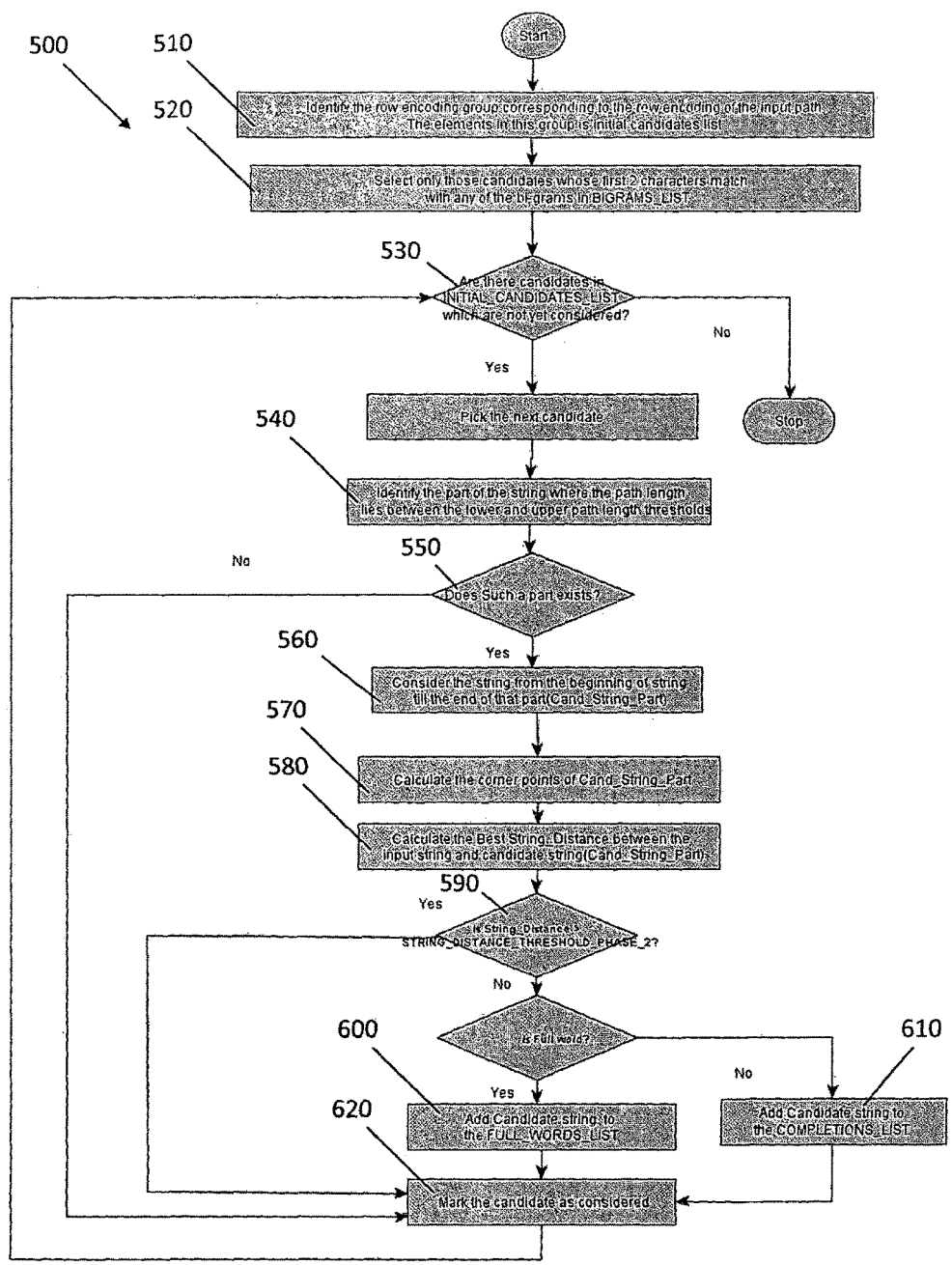
Figure 6: Phase 2 suggestions

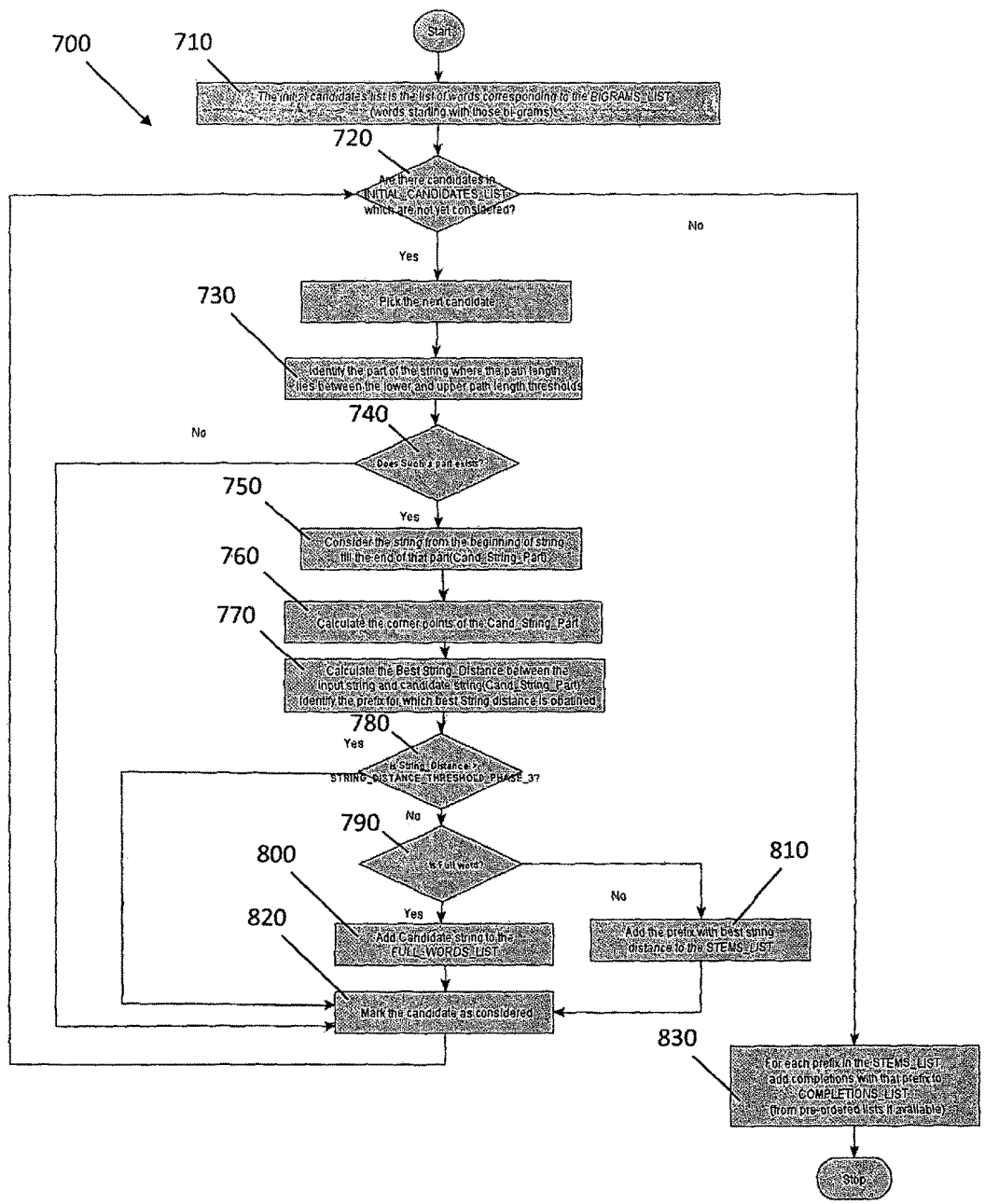
Figure 7: Phase 3 suggestions

INPUT PATTERN DETECTION OVER VIRTUAL KEYBOARD FOR CANDIDATE WORD IDENTIFICATION

This application is a filing under 35 U.S.C. § 371 of International Patent Application PCT/IN2014/000039, filed Jan. 20, 2014, which claims priority to Indian Patent Application No. 260/CHE/2013, filed Jan. 21, 2013. The contents of International Patent Application PCT/IN2014/000039 and Indian Patent Application No. 260/CHE/2013 are incorporated by reference in their entirety.

TECHNICAL FIELD

The present invention relates to a computer-implemented method; a computing device; a set of computational instructions; and a computer-readable medium.

BACKGROUND OF THE INVENTION

It is known from U.S. Pat. No. 7,098,096 to provide a method and system of inputting alphabetic text using a virtual keyboard on a touch sensitive screen. The method and system detects a continuous contact with the touch sensitive screen. The user can thereby trace a continuous input pattern and one or more candidate words are identified for selection. However, the input pattern must be traced from the first letter of the word to the last letter to generate suitable candidate words.

It is against this backdrop that the present invention has been developed. At least in certain embodiments, the present invention can overcome or ameliorate at least some of the problems and shortcomings of the prior art systems.

SUMMARY OF THE INVENTION

Aspects of the present invention relate to a computer-implemented method; a computing device; a set of computational instructions; and a computer-readable medium.

According to a further aspect of the present invention there is provided a computer-implemented method for inputting text into an electronic device, the method comprising:
  displaying a virtual keyboard comprising a plurality of keys on a display screen, one or more characters being associated with each of said keys; and
  detecting an input pattern generated by a user and identifying one or more of said keys positioned on or proximal to said input pattern;
  wherein the keys in the virtual keyboard are allocated to pre-defined groups each comprising a plurality of said keys;
  the method comprises encoding the input pattern in dependence on the pre-defined groups in which each of said one or more identified keys is arranged; and
  identifying one or more candidate words to be input into the electronic device based on the encoded input pattern.

The method includes encoding the input pattern to facilitate identification of candidate words for selection by the user.

One or more characters can be associated with each of said keys. The method can comprise generating a character string consisting of characters associated with each key position on or proximal to said input pattern. The characters in the character string are arranged sequentially to match the sequence in which the input pattern traces said one or more keys.

The one or more candidate words can be selected from a database. The database can, for example, comprise one or more dictionaries. The database can be stored on a storage device, such as volatile or non-volatile memory. The candidate words can be identified from one or more sets of words stored in a database. The words stored in each set within the database can comprise or consist of a pre-defined string combination. Thus, the words can be catalogued into groups based on the pre-defined string combinations. The method can comprise identifying one or more of said sets based on a string combination corresponding to at least a portion of the input pattern. The words in said one or more sets are pre-ranked, for example based on frequency and/or context data.

The portion of the input pattern can be an initial portion of the input pattern. Thus, the string combination can correspond to a character string at the beginning of the candidate word. The string combination can comprise or consist of a bigram or a trigram. The bigram or trigram can be identified with reference to a start point of the input pattern and one or more subsequent corner points. The bigram or trigram list can be sorted offline or at runtime based on offline and learnt user input data.

The method can comprise determining a length of the input pattern. The length of the input pattern can be measured from the input pattern or can be calculated, for example based on a character string derived from the input pattern. A threshold input pattern length can be calculated based on the measured input pattern length. The shortlist of words can be selected by removing words having an input pattern length less than a lower threshold input pattern length and/or an input pattern length greater than an upper threshold input pattern length. The input pattern length can be defined by an upper length threshold and/or a lower length threshold.

The pre-defined groups of keys can each correspond to a region or cluster in the virtual keyboard. For example, the pre-defined groups can correspond to a row of said keys in the virtual keyboard.

A unique identifier can be associated with each of said pre-defined groups. The unique identifier can, for example, comprise an integer or a character. The input pattern can be encoded based on the unique identifiers associated with the pre-defined groups in which each of said one or more identified keys is arranged.

The database comprises a plurality of words and an input sequence code can be stored for each word. The input sequence code can be derived from the unique identifier defined for the pre-defined groups in which each letter of the word is arranged. Rather than store the input sequence code, the input sequence code can be calculated for each word. The input sequence code can, for example, be calculated at least substantially in real time.

The method can also comprise measuring a length of the input pattern and determining an upper length threshold and/or a lower length threshold based on said measured length. The method can subsequently comprise selecting said one or more candidate words based on the upper length threshold and/or the lower length threshold. The method can, for example, comprise eliminating any word(s) having an input length which is greater than the upper length threshold and/or lower than the lower length threshold. In the alternative, the method can comprise selecting any word(s) having an input length which is between the upper and lower length thresholds.

According to a still further aspect of the present invention, there is provided a computer-implemented method for inputting text into an electronic device, the method comprising:

displaying a virtual keyboard comprising a plurality of keys on a display screen, the keys being arranged in pre-defined groups and one or more characters being associated with each key;

detecting an input pattern generated by a user and identifying one or more of said keys positioned on or proximal to said continuous input pattern;

determining a length of the input pattern and calculating an upper length threshold and/or a lower length threshold based on said measured length; and identifying one or more candidate words to be input into the electronic device based on the upper length threshold and/or the lower length threshold. For a candidate string, the method can comprise identifying the part of the string which falls within the upper and/or lower path length thresholds and then identifying the part of the string that gives an appropriate (or best) match. The method can, for example, comprise eliminating any word(s) having an input length which is greater than the upper length threshold and/or lower than the lower length threshold.

The input pattern comprises a start point, for example corresponding to an initial contact made by the user on a touchscreen; and an end point, for example corresponding to a final contact made by the user on a touchscreen. The method described herein can include forming one or more character strings each consisting of characters associated with each key positioned on or proximal to said input pattern. A plurality of character strings can be formed for each input pattern, the character strings corresponding to the different combinations of strings. The method can comprise identifying all possible combinations of character string that include the start point and anything in or around the start point; and/or the end point and anything in or around the end point. The character string can be filtered to identify one or more candidate words for input into the electronic device. The filtering of the character string can include removing characters from the character string which do not form valid combinations with other characters in the character string.

According to a still further aspect of the present invention, there is provided a computer-implemented method for inputting text into an electronic device, the method comprising:

displaying a virtual keyboard comprising a plurality of keys on a display screen, one or more characters being associated with each of said keys;

detecting an input pattern generated by a user and forming one or more character strings consisting of characters associated with each key positioned on or proximal to said input pattern; and filtering the one or more character strings to identify one or more candidate words for input into the electronic device;

wherein filtering the character string comprises identifying valid and/or invalid string combinations within each character string. Filtering the character string can comprise eliminating characters from the character string which do not form valid combinations. The filtration can, for example, comprise removing any invalid character combinations. A comparison of the filtered character string (typically comprising a combination of strings) can then be made with a dictionary to identify candidate words. The valid combinations and/or invalid combinations can be pre-defined or can be determined according to a rule set. Thus, valid and/or invalid combinations can potentially be generated offline.

The valid and/or invalid string combinations could be identified anywhere within the candidate word(s). Alternatively, the filtration of the character string can comprise identifying valid and/or invalid string combinations at the beginning of the candidate word(s).

The character string can comprise checking whether a particular character in the character string in combination with each subsequent character in the character string forms a valid combination. The filtering of the character string can be initiated with the first character in the character string (i.e. corresponding to a start point of the input pattern). The filtering can be repeated for each subsequent character remaining in the character string.

The combination of characters can comprise or consist of bigrams or trigrams.

The character string can be compared with a stored candidate string. The comparison can comprise determining a string distance between the character string and the stored candidate string. The string distance can be based on corner points identified in the input pattern. For example, the corner points of a candidate string can be defined or modelled (the corner points being those points where there will be a change in angle and/or direction if lines are drawn joining the characters of the string on the layout). A start character(s) and/or an end character(s) of the candidate string can be interpreted as corner points of the modelled input pattern. A comparison can then be performed to match one or more corner points of the candidate string with one or more corner points of the input pattern. The comparison can be performed using dynamic time warping (DTW), for example. The sequences in a DTW algorithm can, for example, be a first set of corner points for the candidate string and a second set of corner points for the input pattern.

The method can comprise identifying one or more corner points in said input pattern. The corner points can comprise a point change in direction of the input pattern (i.e. an apex in the input pattern); and/or a localised change in curvature of the input pattern (typically a locally maximal curvature). An included angle and/or curvature can be measured at said one or more corner points. A weighting can be applied based on the measured included angle and/or curvature at each corner point. For example, a higher weighting can be allocated for a smaller corner point angle. A start point and/or an end point of the input pattern can be interpreted as a corner point of the input pattern.

The method can comprise applying a pattern matching algorithm to determine a correlation between said input pattern and a modelled input pattern for a candidate word. The input pattern can be modelled for one or more candidate words stored in a database. The modelled input pattern can be dynamically created and/or modified, for example based on the history of the users input. The model can, for example, identify the location and/or included angle of one or more corner points that would be present in an input pattern traced for a given candidate word. The pattern matching algorithm can determine the correlation between the input pattern traced by the user and a modelled (virtual) input pattern associated with a candidate word. The pattern matching algorithm can determine the correlation between a portion of the input pattern traced by the user and the modelled input pattern for the candidate word. The pattern matching algorithm can determine the correlation between the input pattern traced by the user and a modelled input pattern associated with a prefix of the candidate word.

According to a further aspect of the present invention there is provided a computer-implemented method for inputting text into an electronic device, the method comprising:

displaying a virtual keyboard comprising a plurality of keys on a display screen, the keys being arranged in pre-defined groups and one or more characters being associated with each key;

detecting an input pattern generated by a user and identifying one or more of said keys positioned on or proximal to said continuous input pattern;

applying a pattern matching algorithm to determine a correlation between said input pattern and a modelled input pattern for a candidate word; and identifying one or more of said candidate words to be input into the electronic device based on said correlation. The modelled input pattern is a virtual model of an input pattern generated for one or more candidate words stored in a database. The modelled input pattern can be created from the sequence of characters in the candidate word with reference to the known positions of the corresponding keys in a keyboard. The pattern matching algorithm can determine the correlation between the input pattern traced by the user and the modelled input pattern associated with a candidate word. The modelled input pattern can be dynamically created and/or modified, for example based on the history of the users input. The modelled input pattern can be generated based on the same keyboard information (for example dimensions and layout) as the virtual keyboard on which the input pattern is traced.

The modelled input pattern can, for example, identify the location and/or included angle of one or more corner points which would be present in an input pattern traced for a given candidate word. The method can comprise identifying a first set of corner points in said input pattern; and identifying a second set of corner points in said modelled input pattern. The pattern matching algorithm can determine a correlation between the first and second sets of corner points. A weighting can be applied to each corner point in said first set and/or said second set based on the included angle (either measured or modelled).

The pattern matching algorithm can determine the correlation between a complete input pattern (for example determined with reference to start and end points) and the complete modelled input pattern for the candidate word. The pattern matching algorithm can determine the correlation between a portion of the input pattern traced by the user and a portion of the modelled input pattern for the candidate word. For example, the pattern matching algorithm can determine the correlation between sequences of characters (for example bigrams, trigrams or n-grams) forming a portion of the candidate word. The pattern matching algorithm can determine the correlation between the input pattern traced by the user and a modelled input pattern associated with a prefix of the candidate word.

The pattern matching algorithm can be a dynamic time warping algorithm.

The candidate word can be stored in a dictionary. The method can comprise selecting the candidate word and then modelling the input pattern of the selected candidate word. The candidate word can be selected using the other techniques described herein, for example.

According to a yet still further aspect of the present invention there is provided a computer-implemented method for inputting text into an electronic device, the method comprising:

displaying a virtual keyboard comprising a plurality of keys on a display screen, one or more characters being associated with each of said keys;

detecting an input pattern generated by a user; and identifying one or more corner points in said input pattern;

wherein an included angle and/or curvature is measured at said corner point and a weighting applied based on the measured included angle and/or curvature.

According to a yet still further aspect of the present invention there is provided a computer-implemented method for inputting text into an electronic device, the method comprising:

modelling an input pattern to be traced on a virtual keyboard to input a candidate word;

the modelled input pattern comprising the location of one or more corner points in relation to the virtual keyboard. The modelled input pattern can also determine an included angle at each of said one or more corner points. The method can also comprise applying a weighting to each corner point based on the modelled included angle. The method can be utilised to model a virtual input pattern for one or more candidate words in a dictionary. The modelled input pattern can be compared with a traced input pattern, for example using a pattern matching algorithm, to measure correlation.

The methods described herein can comprise outputting one or more of said candidate words for selection by a user. The one or more candidate words can, for example, be displayed on a screen or display. The candidate words can be full words or word completions. The candidate word can be inserted inline (i.e. directly into the text being input by the user) without the user selecting the candidate word. Alternatively, or in addition, several candidate words can be displayed for selection by the user. The method can comprise inserting full words directly inline; and/or displaying one or more word completions in a list for selection by the user. A full word can be inserted automatically into the text being input into the electronic device. A list of word completions can be displayed and one of said word completions inserted into the text once it has been selected by the user, for example by tapping the desired word completion in the list.

According to a further aspect of the present invention there is provided a computing device (or apparatus) configured to execute instructions to implement the method(s) as described herein. The computing device can comprise one or more electronic processors. The one or more electronic processors can be configured, in use, to perform computational instructions to implement the method(s) described herein.

According to a still further aspect of the present invention there is provided a set of computational instructions which, when executed by a computing device, cause the computing device to perform the method described herein. The computational instructions can be supplied on a computer-readable medium or can be delivered over a network, such as the internet.

The nomenclature 'n' and 'k' are used herein to indicate whole numbers which can be one, or greater than one. The values of 'n' and 'k' can be pre-defined or can be specified dynamically. The term "prefix" used herein is not limited to an affix placed before a word. Rather, the term "prefix" has been used herein to refer to the initial character combination, for example a bigram or trigram, disposed at the beginning of the word.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 3 shows a first flow chart outlining the procedural steps of the method according to an embodiment of the present invention;

FIG. 4 shows a second flow chart outlining the procedural steps for processing a traced input pattern;

FIG. 5 shows a third flow chart outlining the procedural steps for a first phase of candidate word selection;

FIG. 6 shows a fourth flow chart outlining the procedural steps for a second phase of candidate word selection; and FIG. 7 shows a fifth flow chart outlining the procedural steps for a third phase of candidate word selection.

DETAILED DESCRIPTION OF AN EMBODIMENT

The present invention relates to a system and method for inputting text to an electronic device based on a continuous input pattern traced by a user. By way of example, the present invention can be implemented in an electronic device having a touchscreen enabling the user to trace the continuous input pattern. The electronic device can, for example, comprise a cellular telephone or a tablet computer.

Figure 1:
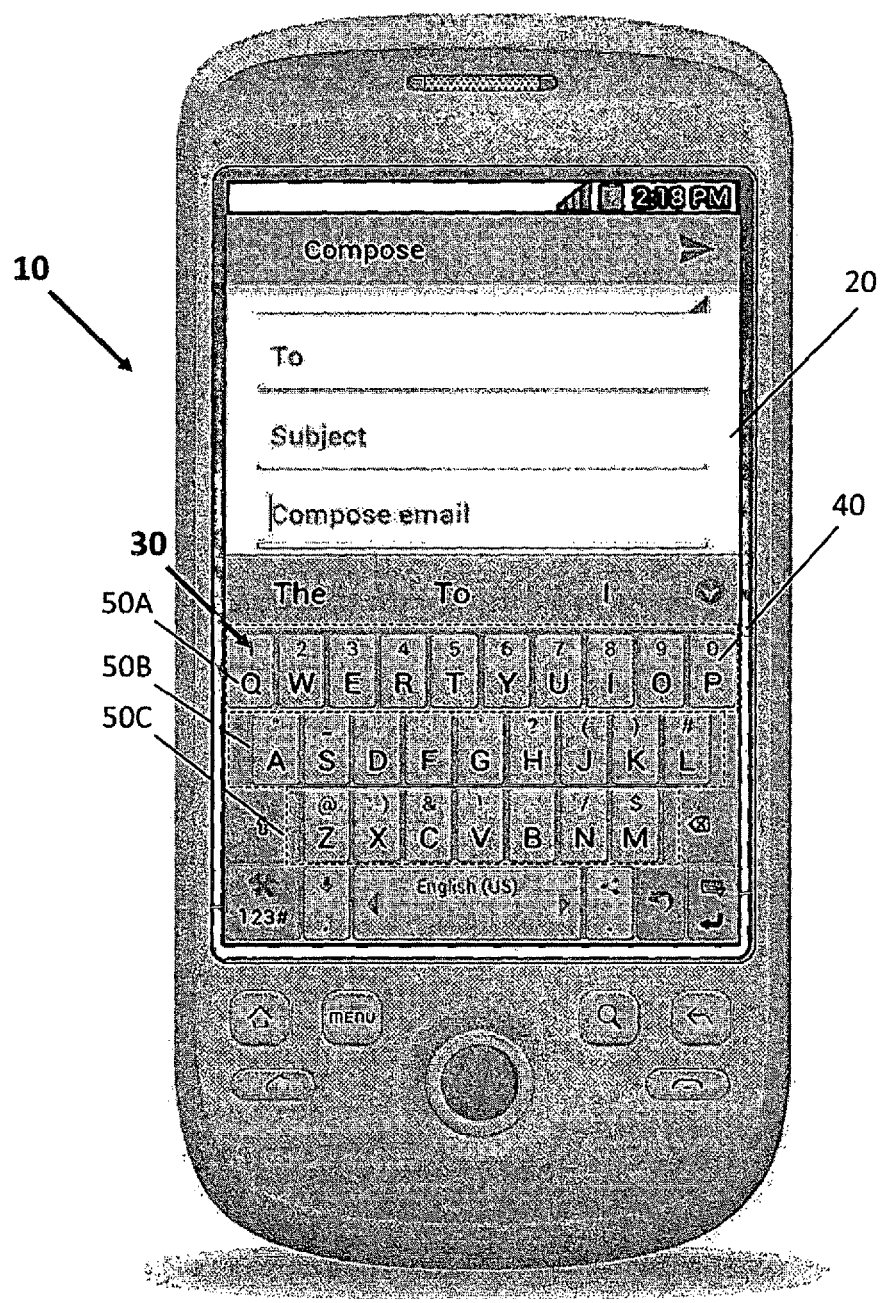
FIG. 1 shows a cellular telephone configured to operate in accordance with an embodiment of the present invention.

A cellular telephone 10 having a continuous text input system in accordance with an embodiment of the present invention is illustrated in FIG. 1. In the present embodiment, the cellular telephone 10 comprises a touchscreen display 20 for displaying system information and receiving user inputs. The touchscreen display is configured to monitor the X, Y coordinates of one or more contact points with the display 20. A continuous trace pattern can be determined by collecting the X, Y coordinates while the user maintains contact with the touchscreen display 20 (i.e. from detection of a finger down event to a finger lift off event). The touchscreen display 20 can also estimate a contact pressure based on the contact area.

The touchscreen display 20 can provide multi-touch sensing to enable more than one contact point on the screen to be detected at any time. The touchscreen display can, for example, comprise a capacitive touchscreen. A virtual keyboard 30 is displayed on the touchscreen display 20 consisting of virtual keys 40. The virtual keys 40 each have a primary label which is mapped to a first character string; and optionally also a secondary label which is mapped to a second character string. The virtual keys 40 are arranged in a QWERTY-type layout consisting of three rows 50A, 50B, 50C. The user can select individual keys 40 by making a point contact on the touchscreen display 20 at an X, Y coordinate corresponding to the location of the key 40. Alternatively, the user can trace a continuous input pattern on the touchscreen display 20 (referred to herein as 'gliding' over the touchscreen display 20) to form a gesture to select a sequence of said virtual keys 40. The system and method according to the present invention are directed primarily to the latter input technique whereby a continuous input pattern is traced by the user. The text input system can be used to input text in various applications operating on the cellular telephone 10, for example to compose part or all of a Short Messaging Service (SMS) text message, an email or a document.

Figure 2:
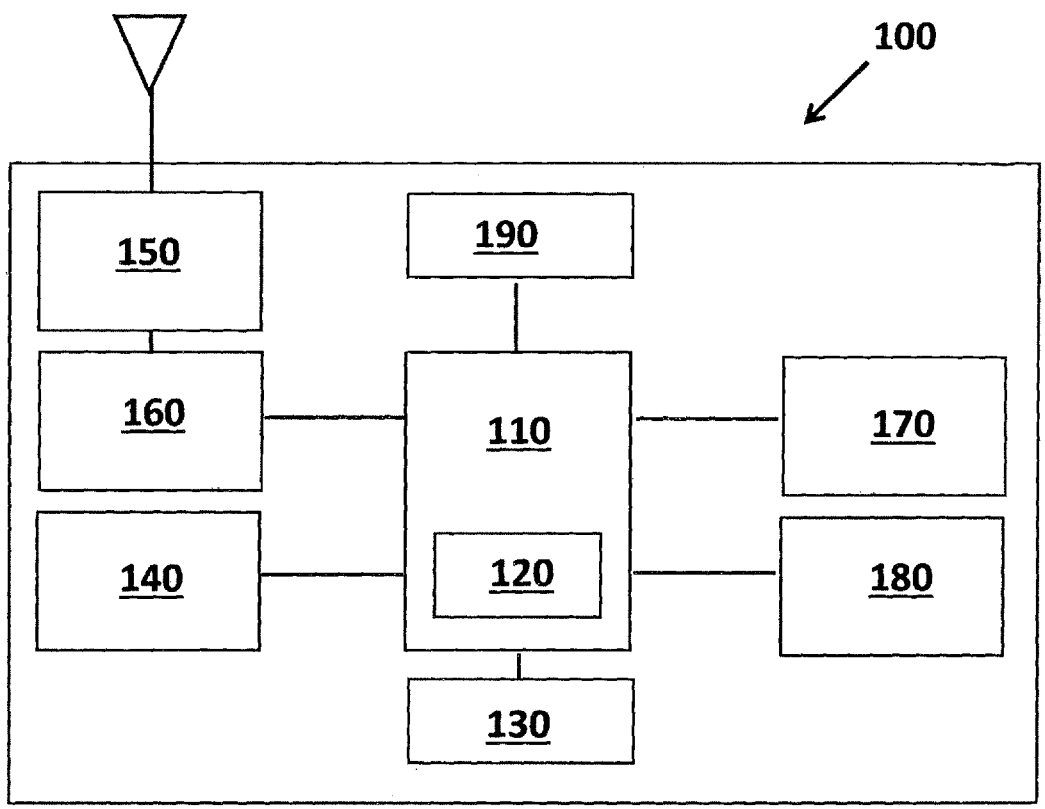
FIG. 2 shows a schematic representation of the components forming the cellular telephone shown in FIG. 1.

A schematic block diagram 100 of the cellular telephone 10 is shown in FIG. 2. The cellular telephone 10 comprises a central processing unit 110 operating a core engine 120 suitable for implementing continuous text input in accordance with an embodiment of the present invention. The central processing unit 110 is coupled to an on-board memory 130 and an input/output interface 140 associated with the touchscreen display 20. The cellular telephone 10 also comprises a radio circuit 150 and a signal processing circuit 160 for wireless communication over a cellular network. A microphone 170 and a speaker 180 are provided for the respective input and output of sound signals. A local wireless transceiver 190 can also be provided to establish communication over a WiFi™ network or the like.

The core engine 120 according to an aspect of the present embodiment is configured to facilitate the input of one or more words in response to a continuous input pattern traced by the user on the touchscreen display 20. The core engine 120 can be embedded on the central processing unit 110 (for example in Read Only Memory) or can operate as a software application providing a set of computational instructions to control operation of the central processing unit 110. The core engine 120 is configured to suggest candidate words for selection by the user. The candidate words are disposed in a database stored on the on-board memory 130.

The core engine 120 provides an Application Programming Interface (API) for collating continuous text input suggestions in the form of a 'Full Word' (i.e. a complete word); and/or a 'Word Completion' (i.e. the remainder of an input word is completed based on one or more characters input by the user). The Full Word and Word Completion suggestions are both selected from the candidate words disposed in the database stored on the on-board memory 130. The core engine 120 inserts the top most Full Word suggestion (if available) inline into a text input field. The Word Completions are displayed in a suggestion bar for selection by the user.

The user traces an input pattern on the touchscreen display 120 and a sequence of X, Y coordinates are output to the core engine 120. The core engine 120 analyses the X, Y coordinates to output said Full Word and/or Word Completion suggestions. The core engine 120 outputs the suggestion(s) intermediately (i.e. while the input pattern is being traced). The output from the core engine 120 can, for example, be based on one or more of the following parameters: (a) at periodic intervals based on time; (b) after every $n^{th}$ character is input; (c) after every path distance interval of some length x is reached; and (d) when the user has paused at any character.

A continuation flag can be output to determine if the current list of X, Y coordinates is a continuation of the X, Y coordinates sent in the previous request. The default setting is to set the continuation flag as 'false'. This is useful for the situation where the core engine 120 requests suggestions intermediately before finger lift off. By way of example, if the user has traced an input pattern made up of the characters "abcde" and not terminated contact with the touchscreen display 20, the co-ordinates of "abcde" are transmitted to the core engine 120 with the continuation flag set to false and a request for suggestions. If the user then continues to trace the input pattern and the total input string is "abcdefgh", when requesting suggestions only the newly traced strings co-ordinates (i.e. "fgh") are transmitted to the core engine 120 with the continuation flag set to 'true'. The core engine 120 caches the X, Y co-ordinates and any other relevant information from the last request and uses it when the continuation flag is 'true' for the next suggestion request to improve performance.

The API supports receiving a query to output both Full Word suggestions; and/or Completions. A Full Words percentage is applicable when both Full Words and Completions are requested. The default setting is to provide one (1) Full Word suggestion, but the API supports giving a percentage of the total suggestions as Full Word suggestions. For example if the number of suggestions requested is twenty (20) and Full Words percentage requested is 25%, then a maximum of five (5) Full Word suggestions will be given.

A first flow chart 200 illustrating the high level operation of the core engine 120 according to the present embodiment is shown in FIG. 3. The user traces a continuous input pattern on the touchscreen display 20 and the X, Y coordinates are output to the core engine 120 (STEP 210). The core engine 120 utilises a three-phase approach to generate Full Word and Completion suggestions which are added to a Suggestion List. The three phases are described herein as Phase 1 (STEP 220), Phase 2 (STEP 230) and Phase 3 (STEP 240). The three phases can be performed sequentially and once they have been completed, any duplicate suggestions are removed from the Suggestion List (STEP 250). The remaining suggestions are output for display on the touchscreen display 20 to be selected by the user (STEP 260).

A second flow chart 300 illustrating the processing of the input pattern traced by the user is illustrated in FIG. 4. The X, Y coordinates are supplied to the core engine 120 from the touchscreen display 20 and the complete sequence of keys 40 coincident with, or proximal to the input pattern are identified. The characters corresponding to the keys 40 are then combined to form a continuous character string (STEP 310). The resulting character string is formed of a series of characters disposed along, or proximal to the input pattern. The core engine 120 also calculates the path length of the input pattern and determines-upper and lower path length thresholds (described herein) based on the calculated path length (STEP 320). The corner points in the input pattern are identified along with the corresponding keys which, again, are used to identify the characters associated with each corner point (STEP 330). The core engine 120 then compiles a list of all possible combinations of valid prefixes VALID_PREFIXES_LIST (STEP 340). The bigrams which are close to the initial part of the input pattern are then selected (STEP 350). The selected bigrams typically correspond to the first and second letters of the candidate word. A row encoding technique (described herein) is also applied to the input pattern (STEP 360).

The three-phase approach and the processing of the input pattern are described in more detail herein. However, the processing techniques implemented in each phase will first be described.

Pre-Ranking

The words stored in the database are pre-ranked and maintained in different ordered lists for use in different phases of suggestion generation. At each phase, the approach consists of starting with a pre-ranked list of candidates and filtering the candidates based on valid prefix match, path length thresholds and string distance thresholds. These ordered lists can be created offline or online, for example when the system is used for the first time, and can be stored in persistent storage for reuse.

Some or all of these lists can also be dynamically updated based on usage. For example, when a user enters a word, the corresponding uni-frequency count is updated. The ordered lists in which this word appears will also be updated accordingly. The updating of the ordered lists can be performed on every update of the uni-frequency count, periodically or when the system is idle. Space efficient data structures can be used to reduce the storage requirements. Moreover, the number of elements stored in each of these lists can be adjusted as per the storage requirements.

The ordered lists may also be adjusted based on the context i.e. the previous words entered by the user until that time.

The following ordered lists are maintained and in the present embodiment the entries are ordered, for example, based on frequency in descending order:

1. Top n frequent words in the dictionary.
2. All the valid bigrams in the dictionary ordered based on their frequency.
3. For each bigram, top k frequent words (or) all the words corresponding to that bigram ordered based on their frequency.
4. Top most frequent words for prefixes (for all or selected ones) in the dictionary.
5. For each row encoding based group, words will be ordered/ranked based on frequency.

It will be appreciated that other metrics can be used instead of, or in combination with frequency. For example, context data can be used to indicate the likelihood of particular string combinations occurring next to each other.

Context Based Suggestions

The context based suggestions and the continuous text inputs can be based on the previous and previous-previous words in the sentence (if they exist). To generate context based suggestions for each word the following lists are maintained:

1. Next words list—List of words (indices) and the count of how many times it appeared as next word for the current word. The list is ordered based on counts.
2. Next-Next words list—List of words (indices) and the count of how many times it appeared as next-next word for the current word. The list is ordered based on counts.

By way of example, if the user types in "This is a"

For the word "This"—"is" is added to next words list, "a" is added to next-next words list For the word "is"—"a" is added to the next-next words list.

To save storage space, the least recently updated records can be removed from the list. Also, the number of records stored for each word might depend upon its uni-frequency (more records for more frequent words). Alternately, the word bigrams and word trigrams lists can be stored, for example ordered based on their counts.

Considering the previous example, if the user types "This is a"

For the word "This"—"is" is added to bigrams list and "is a" is added to the trigrams list For the word "is"—"a" is added to the bigrams list.

Keyboard Layout Information

The core engine 120 accesses stored information regarding the layout of the virtual keyboard 30 to provide word suggestions. The layout information includes the total display width, total display height, information of each key, information about each row etc. In respect of each key, the following layout information is provided: a row number; index position in a row; key width; key height x- and y-co-ordinates of the top left corner of the key; gap to the left of the key; whether the key is at any of the edges, label etc. The keys are each identified with a unique identifier KEY_ID. In respect of each row, the following layout information is provided: vertical gap; whether the row is at any of the edges (top or bottom); horizontal gap between the keys etc.

For example, the key information for the key 'a' comprises:
row number—1
index position in row—1
key width—48
key height—81
x- and y-co-ordinates of the top left corner of the key—(24, 81)
gap to the left of the key—24,
at the left edge
label: 'a'
The row information for the $1^{st}$ row comprises:
Vertical gap—0
Horizontal gap—0
Edge—top edge The following operations are supported:
1. Identifying the corresponding key and character(s) based on point co-ordinates (X, Y co-ordinates of the point where the user has touched the touchscreen display 20).
2. Identifying the corresponding key.
3. Given two keys, find the DISTANCE (K1, K2) between the keys. Distance between the keys could be the length of the line segment formed by joining the centres of the keys K and K2.
4. Given two characters, find the DISTANCE (char1, char2) between the corresponding keys.

Row Based Encoding

The core engine 120 can analyse the input pattern based on the sequence of rows that need to be passed through to trace an input pattern for a word. The rows of keys are each allocated a unique identifier code and that code is registered each time the input pattern traces over a key in that row. For example, in the QWERTY keyboard according to the present embodiment, the top row of keys is allocated the identifier code '1'; the middle row of keys is allocated the identifier code '2'; and the bottom row of keys is allocated the identifier code '3'. This technique could be extended to allocate identifier codes to other character groups, such as numerical characters, punctuation marks and so on.

The sequence of the identifier codes registered for a particular input pattern can be stored in the form of an encoded pattern for comparison with identifier codes for candidate words. Alternatively, to conserve storage space, the identifier codes for a particular input pattern can be combined, for example by summing the individual identifier codes, to provide a cumulative identifier code for that particular input pattern.

For example: with reference to a QWERTY layout:
To trace the word "about" the input pattern passes through the rows 2, 3, 1.
To trace the word "please" the input pattern passes through the rows 1, 2, 1, 2, 1.
To trace the word "bet" the input pattern passes through the rows 3, 2, 1.

The sequence of row numbers is concatenated for each word to form a number.
"about"—231
"please"—12121
"bet"—321

Variants of this technique include:
1. If the sequence is 123 or 321 then the code for row 2 can be skipped, and encoded as 13 or 31 as it is implicit that the input pattern traces through row 2 to move from row 1 to row 3 or vice versa. For example:
"about"—231
"please"—12121
"bet"—31
2. Each row number can be represented using 2 bits (row 1—01, row 2—10, row 3—11). The concatenation of such representation would form a number.
"about"—231→10 11 01→101101→45
"please"—12121→01 10 01 10 01→0110011001→409
"bet"—321→11 10 01→111001→57

This encoding technique is performed for the candidate words stored in the dictionary and the resulting encoded pattern stored for each word. The words in the dictionary are grouped based on this encoded pattern. For example, all the words having the encoded pattern 12121, such as 'please' and 'plight', are disposed in the same group within the dictionary. Within each group, the words will be ordered based on their frequency of use.

Offline Data Preparation

As outlined herein, the words are stored in a dictionary accessible by the core engine 120. The preparation of the dictionary data can be performed as follows:
1. A dictionary of words stored in a data structure which facilitate the rapid look-up of words and prefixes. For example, a trie data (prefix tree) structure can be used. The words in the dictionary are each assigned a unique index.
2. The top n most frequent word indices are stored for each possible prefix in the dictionary (PREFIX_TREE_WITH_ORDERED_LISTS). This can be either:
   (1) The top n frequent words for every possible prefix; or
   (2) If space optimization is needed:
      a. If trie data structure is being used, then top n frequent word indices are stored as the data associated with the node in the trie corresponding to that prefix.
      b. The top n most frequent words can be stored for only selected prefixes. The number 'n' can also vary based on the prefix. For example, more words can be stored for more commonly used prefixes.

By way of example, the prefixes can be filtered in one or more of following scenarios:
   i. If all the words with that prefix have nearly equal frequencies (within some threshold value DELTA FREQUENCY_THRESHOLD).
   ii. The maximum frequency of all the words with that prefix is less than MIN_FREQUENCY_THRESHOLD.
   iii. The average frequency of all the words with that prefix is less than the AVERAGE_FREQUENCY_THRESHOLD.

The threshold parameters can be adjusted based on the space requirements.
   (3) For prefixes of length 2 (bigrams), the list of all words with that prefix are stored, ordered based on the frequency count (or) alternatively only the top n frequent words are stored for each bigram based on the space requirements.

Included Angle and Corner Point Identification

In the present embodiment, the corner points comprise one or more of the following: a point change in direction of the input pattern; a localised change in curvature of the input pattern; a start point of the input pattern; and an end point of the input pattern. A weighting can be applied to each corner point, for example based on an included angle at a point change in direction; or a measured curvature. The identification of the corner points in the traced input pattern and also in the modelled input pattern can be determined by applying one or more of the following techniques:

Curvature

The curvature at a point is defined as the rate of change of slope as a function of the arc length.

Alternately, the (signed) curvature of a curve could also be defined as the rate of change of direction of the tangent vector parameterized by its arc length. The absolute value of the curvature is a measure of how sharply the curve bends. Curves which bend slowly, which are almost straight lines, will have small absolute curvature.

Curvature at a Point for Digital Curve

The digital curve could be defined as a sequence of points $p_1, p_2, \ldots p_n$, where $p_{i+1}$ is a neighbour of $p_i$. The above definition of curvature does not hold for a digital curve, since an exact mathematical definition is not available for the digital curve. For digital curves, several techniques exist which estimate curvature at a point by use of the information that can be extracted from the neighbouring points.

Corner Points of Digital Curve

The curvature at each point and/or interim points on the digital curve are estimated and those points with local maximal curvature are considered as the corner points. The first and last points on this curve are also included as corner points.

Traced Input Pattern

In the case of the traced input pattern, the input pattern is treated as a digital curve and the corner points are identified. A weighting can be applied to each corner point based on an included angle between the lines drawn joining the identified corner point (in the case of a point change); or based on the estimated curvature at each corner point. For example, a smaller included angle can be given a higher weight and vice versa. The points corresponding to a start point and/or an end point of the traced input pattern can be interpreted as corner points.

Modelled Input Pattern

In the case of the modelled input pattern, the corner points could be defined as those points where there is a change in angle and/or direction, when a series of line segments is drawn joining the keys corresponding to the characters in the candidate word sequentially on the layout. The points corresponding to the start character(s) and/or an end character (s) of the candidate string can be interpreted as corner points. The included angle can be calculated at each corner point. A weighting can be applied based on the calculated included angle. For example, a higher weighting can be allocated for a smaller corner point angle.

Input Pattern Suggestions Generation

The core engine 120 captures the co-ordinates of the points (x- and y-coordinates) that the user has traced with the input pattern.

From the list of the points, the complete sequence of keys and characters that the user has traced are identified using the physical layout information. These will be called INPUT_KEYS and INPUT_STRING respectively.

The complete path length (INPUT_PATH_LENGTH) is calculated for the INPUT_STRING. For example, if the traced input pattern outputs a character string "abcde", the corresponding keys are K1, K2, K3, K4. The path length (INPUT_PATH_LENGTH)=DISTANCE (K1, K2)+DISTANCE (K2, K3)+DISTANCE (K3, K4).

The distance between the keys DISTANCE (K1, K2) represents the length of the line segment joining the centers of the keys k1 and k2. The distance between the characters DISTANCE(c1, c2) is the length of the line segment joining the centers of the keys corresponding to the characters c1 and c2. The length of the path PATH_LENGTH (string) corresponding to the input pattern can be calculated on one string and is the sum of all the distances between consecutive keys corresponding to each character in the string. For example, in the case of the word "awe":

PATH_LENGTH("awe")=DISTANCE("a", "w")+ DISTANCE("w", "e")

The lower and upper path length thresholds are calculated based on PATH_LEN_LOWER_THRESHOLD_PARAM, PATH_LEN_UPPER_THRESHOLD_PARAM and the INPUT_PATH_LENGTH.

By way of example:
If
PATH_LEN_LOWER_THRESHOLD_PARAM=0.2 (20%)
PATH_LEN_UPPER_THRESHOLD_PARAM=0.3 (30%)
Then,
PATH_LEN_LOWER_THRESHOLD=INPUT_ PATH_LENGTH−(0.2*INPUT_PATH_LENGTH)
PATH_LEN_UPPER_THRESHOLD=INPUT_ PATH_LENGTH+(0.3*INPUT_PATH_LENGTH)

From the list of the points captured by the core engine 120, the corner points in the input pattern are identified. A variety of approaches are known for detection of corner points (for example, "Dominant point detection using adaptive bending value", Wen-Yen Wu, Image Vision Computing 21(6): 517-525 (2003)).

The corner points are given weights based on the angle/curvature formed. The larger the angle (or smaller the curvature) formed at the corner point, the lower the weight of that corner point. (For example: if first and second corner points are detected having included angles of 40° and 170° respectively, the first corner point will have a higher weighting.) The corner points with weight less than a predefined angular threshold (ANGULAR_THRESHOLD) are marked as weak corner points and others are marked as strong corner points. This information can be used to perform bigram/trigram filtering and/or when calculating string distances.

From the corner points, the key and the characters corresponding to each corner point using the physical layout information are identified. Specifically:

INPUT_CORNERS_STRING: The first character from INPUT_STRING followed by sequence of corner point's characters followed by the last character from INPUT_STRING; and INPUT_CORNERS_KEYS: The sequence of keys corresponding to the characters in the CORNERS_STRING.

The possible combinations of strings (or keys) are generated from the INPUT_STRING (OR INPUT_KEYS) which are valid prefixes in the dictionary. The first and last characters of INPUT_STRING can vary to be the actual character traced or any character in and around that character. By way of example: if the input pattern generates a character string: "asdfghjkl", possible combinations include "asl", "adl", "asdl", "asdfl". For longer strings, generating all possible combinations is a time consuming task, but it is made feasible by pruning the combinations initially itself if that prefix does not exist in the dictionary.

A set of valid character combinations is stored in the dictionary or in another database. A check is performed to identify valid/invalid combinations within the character string. In the present embodiment, the character combinations stored in the dictionary are bigrams, but trigrams or n-grams could also be used. By way of example, in the case of the character string "asdfghjkl", the first combination generated is "as". Only if "as" is a valid prefix in the dictionary are other combinations starting with the same combination generated, such as "asd", "asdf" etc. Otherwise, the first combination is omitted. After generating all valid combinations, the combinations having path length less than PATH_LEN_LOWER_THRESHOLD are omitted. At the end of this step, there is a set of valid prefixes/words (VALID_PREFIXES_LIST).

The bigrams which are close to the initial part of the traced input pattern are selected. In the present case, the bigrams corresponding to the first two characters of the words are identified. By way of example, if the words identified in the dictionary are "apple", "around", "brilliant", "crunch", then the bigrams in the dictionary are "ap", "ar", "br", "cr". A list of valid bigrams is stored in the dictionary. The bigrams can, for example, be ordered based on their frequency (in descending order). The list can also be dynamically updated based on usage i.e. maintain the counts of the occurrence of each bigram and update it every time a user enters a word. The part of the traced input pattern up to the first (strong) corner point (as determined by the weighting based on the formed angle) is taken and those bigrams whose path is close to this path are selected. For example, if "asdbhjio" is the character string corresponding to the traced input pattern, 'b' is the first strong corner point, then valid bigrams could be "ab", "as", "ad", "ax", "sb". At the end of this step, we get a list of bigrams (BIGRAMS_LIST) and the corresponding range of indices is called BIGRAMS RANGES.

The row based encoding of the input pattern is calculated using the technique described herein. For example, if the input pattern passes through the rows 3, 2, 1, 2 the row encoding would be 3212.

String Distance Calculations

A string distance (STRING_DISTANCE) is calculated by pattern matching algorithm. The string distance (STRING_DISTANCE) provides an indication of the correlation between a path traced by the input pattern and a modelled path for a candidate. In the present embodiment, a low string distance (STRING_DISTANCE) is indicative of a good correlation and a high string distance (STRING_DISTANCE) is indicative of a poor correlation.

The string distance (STRING_DISTANCE) between the character string corresponding to the input pattern and the candidate string (from the Dictionary of words) are computed based on the corner points INPUT_CORNER_KEYS and CAND_CORNERS_KEYS are the sequence of corner keys for input and candidate string respectively. For calculating the string distance (STRING_DISTANCE) on these corner keys sequences, any of the sequence matching or pattern matching algorithms can be used. Dynamic Time Warping (DTW) is one such sequence matching algorithm (see, for example: http://en.wikipedia.org/wiki/Dynamic_time_warping).

DTW is based on dynamic programming technique and can be used to find the similarity between two sequences (which can be of varying length). For applying the sequence matching algorithms, a function is defined for calculating the distance between two elements of the sequence (keys in the current use case). DTW is a pattern matching technique that is used generally for measuring similarity between two sequences. The sequences in a DTW algorithm can, for example, be a first set of corner points for the candidate string and a second set of corner points for the input pattern. A suitable DTW algorithm is as follows:

```
int DTWDistance(s: array [1..n], t: array [1..m]) {
    DTW := array [0..n, 0..m]
    for i := 1 to m
        DTW[0, i] := infinity
    for i := 1 to n
        DTW[i, 0] := infinity
    DTW[0, 0] := 0
    for i := 1 to n
        for j := 1 to m
            cost:= d(s[i], t[j])
            DTW[i, j] := cost + minimum(DTW[i-1, j ], // insertion
                                        DTW[i ,j-1], // deletion
                                        DTW[i-1, j-1]) // match
    return DTW[n, m]
}
```

The STRING_DISTANCE (string1, string2) is a measure for finding the correlation (similarity) between the two strings (string1 and string2). Any pattern matching algorithm can be used to find this correlation. In the present embodiment, the DTW algorithm has been implemented based on the corner points of string1 and string2.

In the present case, the corner points in the input pattern and the corner points of the candidate string are the two sequences which are to be matched. A first curve corresponds to the input pattern traced by the user; and a second curve corresponds to the series of line segments that would be formed when the keys corresponding to the candidate word are joined on the virtual keyboard. The comparison technique described herein attempts to determine the similarity between the first and second curves. However, instead of comparing at each point, the comparison of the first and second curves is performed at the corners since these define the shape of the curve. For example, if the user wanted to trace the word "fail", the corner points traced in the input pattern by the user would be 'f', 'a', 'i', 'l'. When these corner points are compared with the candidate word "fail" (also having the corner points 'f', 'a', 'i', 'l') there is a good correlation between both lists of corner points. Accordingly, the word "fail" would be identified as a good candidate. A different candidate word can also be considered, for example "gail" having the corner points 'g', 'a', 'i', 'l'. The first corner point 'g' is in proximity with 'f', and the remaining corner points are an exact match. Thus, "gail" would also be a good candidate. The actual matching between the corner point lists is performed using the DTW algorithm.

A cost function is calculated between two characters. This cost function CHAR_COST(c1, c2) is used internally within DTW algorithm. In the above algorithm, cost is generally defined as the distance between two elements in the sequence. The cost function calculation between the two keys (CHAR_COST) is assigned based on the proximity of the keys. Different types of proximity errors may be assigned different costs. The costs will be assigned based on one or more of the following parameters: HORIZONTAL_PROXIMITY_COST (cost for horizontal proximity error); VERTICAL_PROXIMITY_COST (cost for vertical proximity error); DIAGONAL_PROXIMITY_COST (cost for diagonal proximity error); and NO_PROXIMITY_COST (cost for no proximity error). If the keys are equal, then the cost would be zero. For example, the cost of different types of errors could be set out as follows:

HORIZONTAL_PROXIMITY_COST—10
VERTICAL_PROXIMITY_COST—20
DIAGONAL_PROXIMITY_COST—40
NO_PROXIMITY_COST—60
For QWERTY layout,
CHAR_COST ('a', 's')—horizontal proximity–cost=10
CHAR_COST ('d', 'x')—vertical proximity–cost=20

Other factors that can also be considered while calculating the STRING_DISTANCE include monitoring the strength of a corner point (for example based on the formed angle). If the corner point is a weak corner point, the cost associated with it can be reduced as there is high probability of error. If a match for a corner point is not identified, the actual string on the input pattern traced by the user can be identified and, if there is a match, the cost can be reduced. For example, if the input pattern string is "asdfbjkl", the input corner strings are "abl" and the candidate corner strings are "adbl". There is no match for character 'd' from candidate corner string. In this case, look for 'd' in between the characters 'a' and 'b' of the actual input pattern string. Since, the character 'd' is found, the cost can be reduced. To improve performance, a check can be performed in this way only when the nearby corner points are in proximity.

Similarly, the cost can be reduced for corner points if there is no proximity but they are close to each other (within some boundary or threshold). The proximity cost can be reduced for first and last characters in the traced input pattern as the users generally tend to make mistakes there. The proximity cost can be reduced for the characters where the users tend to make mistakes generally. For example: users often trace the input pattern through (or make an angle) at 'm' when they intend 'n' or vice versa.

To improve the performance, a cache of the strings and corresponding distances can be maintained, so that the distance value can be directly retrieved. If dynamic programming solutions such as DTW are being used, then (a) a large enough buffer can be pre-allocated for the table that will be used for storing the intermediate results and thus save time on allocating memory for every string distance calculation; and/or (b) the intermediate results can be reused for the next string_distance calculations.

Consider the example of STRING_DISTANCE ("devel", "develops"). If the STRING_DISTANCE ("devel", "deve") is required, this can be obtained directly from the table as it will be already available. Next, to calculate the STRING_DISTANCE ("devel", "developed"), the table contents up to STRING_DISTANCE ("devel", "develop") can be used and then compute the rest only.

Threshold Calculations

As outlined above, path length thresholds are calculated based on the INPUT_PATH_LENGTH. Specifically, the INPUT_PATH_LENGTH is multiplied by lower and upper threshold parameters PATH_LEN_LOWER_THRESHOLD_PARAM, PATH_LEN_UPPER_THRESHOLD_PARAM to determine respective lower and upper thresholds.

A threshold for the STRING_DISTANCE can be defined as a static value for each phase. For example, during analysis in the first phase (Phase 1) the STRING_DISTANCE_THRESHOLD can be set to zero (0); during the second phase (Phase 2) the STRING_DISTANCE_THRESHOLD can be set to two (2); and during the third phase (Phase 3) the STRING_DISTANCE_THRESHOLD can be set to four (4). These threshold values could be defined offline, for example based on sample data collected from different users, empirical data and analysis to determine which parameters provide the optimum results. Alternatively, the values could be adjusted dynamically, for example based on runtime usage.

The initial values for path length thresholds, string distance threshold parameters, cost values used in string distance calculations will be based on the sample data collected from different users. The users will be provided with set of words/phrases/sentences which might be commonly used words/phrases/sentences in the language or information collected from different sources. The co-ordinates of the input pattern generated by the user for this input will be recorded. This data will be used to find the optimum values for the threshold parameters and cost values.

After the system is installed, the user's style can be learnt and the threshold and cost values can be dynamically updated based on the individual user's usage statistics. Whenever a user traces a word and selects a suggestion, the types of mistakes that the user is making (i.e. the user may tend to make more horizontal proximity errors) are analysed and the difference between the actual traced input pattern length and the path length of the word selected. Also, some specific types of commonly made mistakes by the user can also be captured. For example, the user mostly by mistake traces through the letter 'm' when he actually wants to trace through 'n'. Based on all this information, the threshold values and cost values will be adjusted dynamically for that user.

The phased operation of the core engine 120 will now be described in more detail.

Phase 1

With reference to a third flow chart 400 shown in FIG. 5, the generation of suggestions by application of the Phase 1 approach will now be described.

The initial candidates list (INITIAL_CANDIDATES_LIST) is prepared based on the context based suggestions followed by the top n uni-frequency words in the dictionary (STEP 410). The context based suggestions are those continuous text inputs based on the previous and previous-previous word typed by the user. The top n uni-frequency words list can be a static list generated initially based on the uni-frequency counts of the words; or it can be dynamically updated based on the usage. For example, the initial list of top n words and counts are "all" (200), "ail" (150), "bat" (145). If the user has entered "bat" 10 times, "ail" 3 times, "all" 50 times. The counts and the list of words will be updated accordingly. The updated list would be "all" (200), "bat" (155), "ail" (153). The counts will be updated every time the user enters a word. Alternatively, the initial candidates list could be the candidates corresponding to the bigrams in the bigrams list BIGRAMS_LIST, which are pre-ranked.

From the INITIAL_CANDIDATES_LIST, the candidate words are selected which match any of the strings in the VALID_PREFIXES_LIST; or have a prefix which matches any of the strings in the VALID_PREFIXES_LIST (STEP 420). For example, in the case of the character string "asdfghjkl", the VALID_PREFIXES_LIST comprises "all", "afl", "asl"; and the INITIAL_CANDIDATES_LIST comprises "the", "all", "fail", "allow", "hit", "following", "asleep". The candidate words selected for display are: "all", "allow", "asleep".

A processing loop (STEP 430) is then performed to analyse in turn each of the candidate words already identified in the INITIAL_CANDIDATES_LIST. The analysis comprises analysing the character string from the beginning only to a valid prefix match with any of prefixes stored in the VALID_PREFIXES_LIST (STEP 440). The corner points of the candidate string are calculated as CAND_CORNER- S_KEYS. CAND_CORNERS_STRING is the sequence of characters corresponding to the keys in CAND_CORNERS_STRING. For example; for the candidate word "allow", the character string up to "all" (which is in VALID_PREFIXES_LIST) is considered and the corner points are calculated up to that point. The string distance STRING_DISTANCE (detailed later) is calculated between the candidate string and the input string (STEP 450). A comparison is then made between the STRING_DISTANCE and the STRING_DISTANCE_THRESHOLD_PHASE_1 (STEP 460). If the STRING_DISTANCE is greater than the STRING_DISTANCE_THRESHOLD_PHASE_1, then that candidate is eliminated. Otherwise, that word is added to either the completions bucket (COMPLETIONS_LIST) (STEP 470); or the Full Words bucket (FULL_WORDS LIST) (STEP 480). The word is a completion if only a prefix of the candidate string matches with any of the words in VALID_PREFIXES_LIST. For example, in the case of the input character string "asdfghjkl", the VALID_PREFIXES_LIST comprises "all", "afl", "asl" and the Final Candidates list comprises "all", "allow", "asleep". The Full Word candidate output is "all" and the Completion Word candidates are "allow" and "asleep". The candidate is marked as having been considered (STEP 490) and the next candidate is considered.

Phase 2

With reference to a fourth flow chart 500 shown in FIG. 6, the generation of suggestions by application of the Phase 2 approach will now be described.

The row encoding group is identified based on the row encoding of the traced input pattern (STEP 510). The initial candidate words will be the words contained in the group identified based on row encoding. For example, if the row encoding of the traced input pattern is 2312, then the initial candidate list will be the list of elements in the Group 2312. The candidate words are filtered based on the BIGRAMS_LIST. Only those candidates which have the first two (2) characters matching with any one of the bigrams from the BIGRAMS_LIST are selected (STEP 520).

For each of the identified candidates (STEP 530) the part of the string having a path length which falls between the lower path length threshold PATH_LEN_LOWER_THRESHOLD and the upper path length threshold PATH_LEN_UPPER_THRESHOLD is identified (STEP 540). A check is performed to determine if any such part exists (STEP 550). If no such part exists, the candidate word is skipped. The starting and ending indexes of that part of the string are defined as C1 and C2 respectively (STEP 560).

By way of example, consider the scenario where the lower and upper path length thresholds are 29 and 39. If the word is "developed", the path lengths up to each substring could be as follows:

De—20
Dev—25
Deve—27
Devel—30
Develo—32
Develop—35
Develope—41
Developed—50

Then the part of the string within the path length thresholds 29-39 is "lop".

The string is considered only up to the C2 index. The corner points of the candidate string are calculated (CAND_CORNERS_KEYS) (STEP 570). CAND_CORNERS_STRING is the sequence of characters corresponding to the keys in CAND_CORNERS_STRING.

A comparison is performed to determine the correlation between the candidate string and the input string. In the present embodiment, the string distance (STRING_DISTANCE) is calculated as the difference between the candidate string and the input string (STEP 580). The resulting distance STRING_DISTANCE is considered as the best value of distance value of the characters in the range C1 to C2. A smaller string distance (STRING_DISTANCE) is representative of a closer correlation between the candidate string and the input string. In the above example, the candidate string is considered up to "develop". The string distance is calculated between the input string and "develop". In the above example:

String up to "C1-C2"-"lop"
STRING_DISTANCE(input string, "devel")=30
STRING_DISTANCE(input string, "develo")=20
STRING_DISTANCE(input string, "develop")=25
The best distance of all the characters in the range C1 to C2 is "develo", so the string "develo" and the distance 20 will be considered.

A comparison is then made between the STRING_DISTANCE and the STRING_DISTANCE_THRESHOLD_PHASE_2 (STEP 590). If the STRING_DISTANCE is greater than the STRING_DISTANCE_THRESHOLD_PHASE_2 (parameter), then that candidate is eliminated. Otherwise, that word is added to either the Completions bucket COMPLETIONS_LIST (STEP 600) or the Full Words bucket FULL_WORDS LIST (STEP 610). The word is a Full Word if the best distance was obtained for the whole word otherwise it is a Completion.

For the above example, suppose STRING_DISTANCE_THRESHOLD_PHASE_2=22

The word "developed" is selected and added to the Completions list. The candidate is marked as having been considered (STEP 620) and the next candidate is considered.

Alternatively, the initial candidates list could be the candidates corresponding to the bigrams in the bigrams list BIGRAMS_LIST, which are pre-ranked. The row based encoding of the candidate word could be calculated online and compared with the traced input pattern's row based encoding and the candidate word selected accordingly. For example, if the row based encoding of the traced input pattern is 2312, for the candidate word "scored" the row based encoding would be 2312. As the candidate word matches the input pattern encoding, this word would be selected. For the candidate word "scoring" the row based encoding would be 231232. The prefix "2312" of the entire encoding "231232" of the candidate word matches the input patterns encoding and hence the word would be selected as a possible completion.

Phase 3

With reference to a fifth flow chart 700 shown in FIG. 7, the generation of suggestions by application of the Phase 2 approach will now be described.

The initial candidates list is the candidates corresponding to the bigrams in a list BIGRAMS_LIST stored in the database (STEP 710). The list of candidates for each bigram is obtained from PREFIX_TREE_WITH_ORDERED_LISTS.

The analysis is performed in respect of each candidate (STEP 720). The part of the string where the path length of the string falls between the PATH_LEN_LOWER_THRESHOLD and PATH_LEN_UPPER_THRESHOLD is identified (STEP 730). A check is performed to determine if such a part exists (STEP 740). If no such part exists, that candidate word is skipped. The starting and ending index of that string are defined as C1 and C2 (STEP 750).

Considering the above example, for path length thresholds of (29-39) for the word "developed", the path lengths to each substring are as follows:

De—20
Dev—25
Deve—27
Devel—30
Develo—32
Develop—35
Develope—41
Developed—50

Then the part of the string within the thresholds is "lop".

The string is considered only to the C2 index. The corner points of the candidate string are calculated (CAND_CORNERS_KEYS) (STEP 760).

CAND_CORNERS_STRING is the sequence of characters corresponding to the keys in CAND_CORNERS_STRING The STRING_DISTANCE between the candidate string and the input string is calculated (STEP 770). The STRING_DISTANCE is considered to be the best value of distance value of the characters in the range C1 to C2.

In the above example, the candidate string is considered to "develop". String distance is calculated between the input string and "develop". For example:

String till "C1-C2"-"lop"
String_Distance(input string, "devel")=30
String_Distance(input string, "develo")=20
String_Distance(input string, "develop")=25

The best distance of all the characters in the range C1 to C2 is "develo", so the string "develo" and the distance 20 will be considered.

A check is performed to compare the STRING_DISTANCE to the STRING_DISTANCE_THRESHOLD_PHASE_3 (STEP 780). If the STRING_DISTANCE is greater than STRING_DISTANCE_THRESHOLD_PHASE_3 (parameter), then that candidate word is eliminated. Otherwise, that word is added to either the stems bucket (STEMS_LIST) or the Full Words bucket (FULL_WORDS_LIST) (STEP 790). The word is a Full Word if the best distance was obtained for the whole word (STEP 800), otherwise it is a stem (prefix) (STEP 810). For the above example, if STRING_DISTANCE_THRESHOLD_PHASE_3=22, the string "develo" will be selected and added to the stems list. The candidate is marked as having been considered (STEP 820) and the next candidate is considered.

A set of valid character combinations (for example bigrams or trigrams) are defined and a pre-ranked set of words is associated with each valid character combination. In the present embodiment, the valid character combinations form prefixes of the candidate words. For each candidate in the STEMS_LIST the list of words is added to the completions bucket (COMPLETIONS_LIST) if the pre-ranked list of candidates with that prefix is available (STEP 830). If the pre-ranked list is not available, then the list of words with that prefix is added in alphabetical order or in the order retrieved from the dictionary.

The number of words selected for each candidate in STEMS_LIST can vary. For example, if the STEMS_LIST comprises "dev" and "derv", the words starting with prefix "dev" and "derv" are added into the completions list. The COMPLETIONS_LIST comprises the candidates: "development", "developing" and "dervish". The duplicates, if present, are removed from the FULL_WORDS_LIST AND COMPLETIONS_LIST.

Output

The Full Word suggestions would be the suggestions from the FULL_WORDS_LIST and completions would be the suggestions from COMPLETIONS_LIST. Different suggestion types would be assigned to full suggestions and completions to differentiate them and the lists would be output to the platform.

Example

An example of the input of text into the cellular telephone utilising the core engine 120 according to an embodiment of the present invention will now be described.

The user has entered the text "This is" and traces an input pattern corresponding to the next word. The touchscreen display 20 captures the X, Y co-ordinates of the points traced by the user and transmits these to the core engine 120.

The core engine 120 analyses the list of coordinates to determine the input pattern traced by the user. The core engine 120 computes the actual character string corresponding to the input patter. For example, if the user has traced the input pattern passing over or proximal to the keys corresponding to the following letters "asdfghuil". The corresponding keys, corner keys and corners string, path thresholds are calculated. The sequence "ail" is the corner string as the input pattern made an angle at the key corresponding to the letter 'i'.

The core engine 120 generates the valid prefixes of the input string (VALID_PREFIXES_LIST). All the possible prefixes would be "al", "asl", "adl", "afl", "agl", "ah", "aul", "asdl", "asfl", "asgl", "ashl", "asul", "asil" . . . . Out of these the core engine 120 selects the prefixes which are valid in the dictionary and within the path length thresholds. For example, there are no words starting with "adl" so the core engine skips that prefix. Suppose, the set of valid prefixes are "al", "asl", "afl", "agl", "adul" and "ail".

A list of the valid bigrams is generated for the particular input string (BIGRAMS_LIST). The bigrams close to the initial part ("ai") are "al", "as", "ad", "af", "ag", "ah", "au", "ai", "al", "ax", "ax", "si" and "ah". These are pre-ranked, for example based on frequency of use; and/or context.

The input pattern has passed through rows 2, 1 and 2, so the row encoding is 212.

Phase 1 Suggestions:
1. Suppose the context based suggestions are (based on the previous 2 words—"This is")
   1. Good
   2. Terrifying
   3. All
   4. Bad
   5. ailment Suppose the top most uni-frequency words in the dictionary are:
   1. The
   2. To
   3. Of
   4. A
   5. I Initial Candidate list is the context based suggestions followed by the top most uni-frequency words: "Good", "Terrifying", "All", "Bad", "The", "To", "Of", 2. The candidates which do not have a prefix equal to any of the prefixes in VALID_PREFIXES_LIST are filtered. The filtered list would consist of: "all" and "ailment".

3. Calculate String_Distance between input string and the each of the candidate strings.
Suppose,
Word: all, string_Distance (all)=20
Word: ailment, consider string to "ail", string_Distance (ail)=0
4. Filter the candidates whose string distance is above the threshold. Let us say the string distance threshold is 0. The remaining words would be "ailment" and this is identified as a Completion.
5. Phase 1 suggestions:
Full Words—<none>
Completions—"ailment"
Phase 2 Suggestions:
1. Initial candidate list is the list of the words in the row based encoding group corresponding to the input string (212). The words are pre-ranked.
Suppose the list of words is:
"Fill", "fail", "dull", "full", "ill", "sold", "silk", "hill", "hail", "kill", "ariel", "ail", "ails", "loud", "sill", "aids", "assess"
2. Filter the words based on the bigrams list. The remaining words are "silk", "ail", "ails", "sill", "aids", "assess"
3. Filter the candidates based on the path length thresholds. The remaining words are "silk", "ail", "ails", "sill".
4. Calculate the best string distance for each of these words
Let us say,
STRING_DISTANCE("silk")=20
STRING_DISTANCE("ail")=0
STRING_DISTANCE("ails")=0 (string considered till "ail" based on path length match) STRING_DISTANCE("sill")=10
5. Suppose the string distance threshold is 10. The selected candidates would be: "ail", "ails" "sill".
6. Phase 2 suggestions:
Full words—"ail", "sill"
Completions—"ails"
Phase 3 Suggestions:
The Initial Candidates list is the list of candidates for each of the bigrams in the BI_GRAMS list. The bigrams are pre-ranked based on the frequency and the candidates corresponding to each bigram are pre-ranked based on frequency and are obtained from PREFIX_TREE_WITH_ORDERED_LISTS. Suppose some of the candidates are:
Al—al, all, all-rounder, allowing
As—as, asleep, astonish
Ad—adults, adjoining
Af—after, affluent
Si—sir, sing, singing
Ai—ail, ailing, ailments
Filter the candidates based on path length thresholds.
Suppose the remaining candidates are:
Al—al, all, all-rounder, allowing
As—asleep, astonish
Ad—adults, adjoining
Af—affluent
Ai—ail, ailing, ailments
Filter the candidates based on string distance thresholds. Suppose the valid words are: "as", "al", "all" and "ail"; and the valid stems are "all", "asl" and "ail".
For each of the stem, select the top most suggestions from PREFIX_TREE_WITH_ORDERED_LISTS. Suppose they are: "all"—allowing; "asl"—asleep; and "ail"—ailing.
The Phase 3 suggestions are:
Full words: "al", "all", "ail"
Completions: "allowing", "asleep", "ailing"

The duplicate entries are removed and the final lists output for selection by the user are as follows:
Full words—"ail", "sill", "al", "all"
Completions—"ailment", "ails", "allowing", "asleep", "ailing"

End Point Analysis

The first and last characters of the input pattern can be defined as corner points by default. Taking the above example, if the user intends to input the character combination "ail", they would trace an input pattern which generates the character string "asdfghuil". The corner points of the resulting input pattern would be 'a', 'i' and 'l'. The characters corresponding to the start and end points of the input pattern are considered as the first and last corner points by default. Between the start and end points, the input pattern defines an angle at the key corresponding to the character 'I' and this is identified as an intermediate corner point.

For this, each word in the database is compared with the input pattern. If the candidate word is "ailment", it is necessary to determine the correlation between the word "ailment" and the input pattern. For identifying possible Word Completions, the last character of the candidate word cannot be matched with the last character of the input pattern (as the input pattern does not correspond to the complete word). In the present example, the match for the last character 'l' of the input pattern is somewhere between the candidate word "ailment". One way of doing this is to match each character of the candidate word with the last character of the input pattern until a match is achieved i.e. compare 'l' (last character of the input pattern) with 'a', 'i', 'l'. The match occurs at the $3^{rd}$ position, so the comparison is made up to the $3^{rd}$ character (i.e "ail").

The comparison of each character is time consuming. So, path length thresholds are implemented. Instead of comparing with all characters, the part of the string falling within the path length threshold is identified. For example, the input pattern path length is 7 and thresholds are defined as −1/+2 giving a lower threshold of 6 and an upper threshold of 9.
1. For the candidate word "ailment"
Suppose
path_length('a'→'i')=5, (path length is less than the lower threshold)
path_length ('a'→'i'→'l')=7, (path length is between the thresholds)
path_length ('a'→'i'→'l'→'m')=8, (path length is between the thresholds)
path_length ('a'→'i'→'l'→'m'→'e')=12. (path length is greater than the upper threshold)
Only the part of the string "lm" is considered and only in respect of those characters having an end character match. The character "l" is identified as matching as the $3^{rd}$ character. The STRING_DISTANCE (input pattern, whole word "ailment")=STRING_DISTANCE(IP, "ail") ("ail"—initial part of word "ailment")
2. Suppose, another word is "agolmler".
path_length('a'→'g')=3, (path length is less than the lower threshold)
path length('a'→'g'→'o')=6, (path length is between the thresholds)
path length ('a'→'g'→'o'→'l')=7, (path length is between the thresholds)
path_length ('a'→'g'→'o'→'l'→'m')=8, (path length is between the thresholds)
path_length ('a'→'g'→'o'→'l'→'m'→'l')=9, (path length is between the thresholds)

path length ('a'→'g'→'o'→'l'→'m'→'e')=12. (path length is greater than the upper threshold)

The part of the string within path length thresholds is identified as "olml" and a character match occurs at two places (4$^{th}$ and 6$^{th}$ characters). In this scenario, the STRING_DISTANCE is considered up to both the 4$^{th}$ and 6$^{th}$ characters, specifically:
(1) STRING_DISTANCE(IP, "aol") (to the 4$^{th}$ position)
(2) STRING_DISTANCE(IP, "aolml") (to the 6$^{th}$ position)
STRING_DISTANCE(IP, whole word "agolmler")=minimum of (1) and (2)
3. Suppose the candidate word is "awe",
dist('a'→'w')=1, dist('a'→'w'→'e')=2

There is no part of the string which falls within the path length thresholds (6-9), so this word is eliminated.

It will be appreciated that various changes and modification can be made to the system and method described herein without departing from the spirit and scope of the present invention. The invention has been described with reference to a touchscreen, but it will be appreciated that other input techniques could be utilised. For example, the present invention could be implemented in conjunction with a projection keyboard, an on-screen cursor (for example controlled by a keyboard, computer mouse, a joystick, or a brainwave control system to trace the input pattern). Moreover, the processing to implement the present invention could be performed remotely, for example over a communication network (such as the internet or a cellular communication network). (o reduce local processing requirements.

The present invention has been described as identifying string combinations traced by the input pattern which are defined as valid character combinations (or prefixes) within the dictionary. An alternate approach is to check each word in the dictionary to determine if any string combination (or prefix) within any of the words is a sub-sequence of the input pattern. Any words comprising the string combination are then identified as candidate words for input.

We claim:

1. A computer-implemented method for inputting text into an electronic device, the method comprising:
    displaying a virtual keyboard comprising a plurality of keys arranged in a plurality of pre-defined non-overlapping groups on a display screen, each pre-defined non-overlapping group allocated an associated one of a plurality of unique identifier codes, one or more characters being associated with each of said keys;
    detecting an input pattern generated by a user on the display screen over the plurality of pre-defined non-overlapping groups of the virtual keyboard;
    encoding the input pattern by generating a sequence of the plurality of unique identifier codes corresponding to the input pattern over the plurality of pre-defined non-overlapping groups; and
    identifying one or more candidates to be input into the electronic device based on the encoded input pattern; and
    for a candidate of the one or more candidates:
        identifying a plurality of parts of the candidate that have associated path lengths that fall within an upper path length threshold and a lower path length threshold, wherein the plurality of parts form a sequence, and wherein each next part in the sequence has a same set of characters as a prior part in the sequence and an additional character of the candidate;
        determining a plurality of string distances, each string distance being between a respective one of the plurality of parts and the input pattern;
        identifying a part from among the plurality of parts that has a best string distance from among the plurality of string distances; and
        adding the candidate to a list for output by the electronic device based on a comparison between the best string distance and a string distance threshold.

2. A computer-implemented method as claimed in claim 1, wherein the one or more candidates are identified from one or more sets of words stored in a database, the words in each set comprising a pre-defined string combination;
    wherein the method further comprises identifying one or more of said sets based on a string combination corresponding to at least a portion of the input pattern.

3. A computer-implemented method as claimed in claim 2, wherein said portion of the input pattern is an initial portion of the input pattern and the string combination corresponds to a character string at the beginning of the candidate.

4. A computer-implemented method as claimed in claim 1, wherein an input sequence code is stored for each candidate of the one or more candidates, the input sequence code being derived from at least one of the plurality of unique identifier codes allocated to the plurality of pre-defined non-overlapping groups.

5. A computer-implemented method as claimed in claim 1, comprising:
    determining a length of the input pattern and calculating the upper path length threshold and the lower path length threshold based on said determined length;
    wherein identifying said one or more candidates is based on the upper path length threshold and/or the lower path length threshold.

6. A computer-implemented method as claimed in claim 1, comprising applying a pattern matching algorithm to determine the best string distance.

7. A computer-implemented method as claimed in claim 1, wherein displaying the virtual keyboard, detecting the input pattern, encoding the input pattern, and identifying the one or more candidates are performed in a first phase of the method, the method further comprising:
    in a second phase forming one or more character strings consisting of characters associated with each key positioned on or proximal to said input pattern and filtering the one or more character strings to identify one or more candidates for input into the electronic device, wherein filtering the character string comprises identifying valid and/or invalid string combinations within each character string in the second phase; and
    in a third phase the keys displayed in the virtual keyboard are arranged in pre-defined groups and one or more characters is associated with each key, a pattern matching algorithm being applied to determine a correlation between said input pattern and a modelled input pattern for a candidate, and identifying one or more of said candidates to be input into the electronic device based on said correlation;
    wherein the first, second and third phases are performed in any order.

8. A computer-implemented method as claimed in claim 1, wherein the plurality of pre-defined non-overlapping groups comprises a plurality of rows of the virtual keyboard.

9. A computer-implemented method as claimed in claim 1, wherein the one or more candidates each comprise a word, a phrase, or a sentence.

10. A computer-implemented method for inputting text into an electronic device, the method comprising:

displaying a virtual keyboard comprising a plurality of keys arranged in a plurality of pre-defined non-overlapping groups on a display screen, each pre-defined non-overlapping group allocated an associated one of a plurality of unique identifier codes, one or more characters being associated with each of said keys;

detecting an input pattern generated by a user on the display screen over the plurality of pre-defined non-overlapping groups of the virtual keyboard;

generating an initial list of candidates based on a sequence of the plurality unique identifier codes corresponding to the input pattern over the plurality of pre-defined non-overlapping groups;

generating a character string corresponding to the input pattern; and filtering the character string to identify valid and/or invalid combinations of characters within the character string; and generating a filtered list of candidates by:
  matching the initial list of candidates to the valid combinations of characters; and
  for a candidate in the initial list:
    identifying a plurality of parts of the candidate that have associated path lengths that fall within an upper path length threshold and a lower path length threshold, wherein the plurality of parts form a sequence, and wherein each next part in the sequence has a same set of characters as a prior part in the sequence and an additional character of the candidate;
    determining a plurality of string distances, each string distance being between a respective one of the plurality of parts and the input pattern;
    identifying a part from among the plurality of parts that has a best string distance from among the plurality of string distances; and
    adding the candidate to the filtered list based on a comparison between the best string distance and a string distance threshold.

11. A computer-implemented method as claimed in claim 10, wherein filtering the character string comprises determining if a particular character in the character string in combination with each subsequent character in the character string forms a valid combination.

12. A computer-implemented method as claimed in claim 11, wherein filtering the character string comprises initiating the filtering by checking for a valid combination with a first character in the character string which corresponds to a start point of the input pattern.

13. A computer-implemented method as claimed in claim 12, wherein filtering the character string further comprises checking each character in the character string in combination with each subsequent character in the character string for one or more valid combinations of characters.

14. A computer-implemented method as claimed in claim 10, wherein the plurality of pre-defined non-overlapping groups comprises a plurality of rows of the virtual keyboard.

15. A computer-implemented method as claimed in claim 10, wherein the candidates in the initial list each comprise a word, a phrase, or a sentence.

16. A computer-implemented method for inputting text into an electronic device, the method comprising:
  displaying a virtual keyboard comprising a plurality of keys arranged in a plurality of pre-defined non-overlapping groups on a touchscreen display, each pre-defined non-overlapping group allocated an associated one of a plurality of unique identifier codes one or more characters being associated with each key;
  receiving a user input that contacts the touchscreen display and moves over the plurality of pre-defined non-overlapping groups of the virtual keyboard to form a continuous input pattern over the plurality of pre-defined non-overlapping groups;
  collecting X,Y coordinates of a plurality of contact points in response to the movement of the user input over the plurality of pre-defined non-overlapping groups;
  detecting the continuous input pattern and registering a respective one of the plurality of unique identifier codes to a sequence when the input pattern traces over a key in a group of the plurality of pre-defined non-overlapping groups associated with the respective one of the plurality of unique identifiers based on collecting the X,Y coordinates;
  identifying one or more candidates to be input into the electronic device based on the continuous input pattern and the sequence; and
  for a candidate of the one or more candidates:
    identifying a plurality of parts of the candidate that have associated path lengths that fall within an upper path length threshold and a lower path length threshold, wherein the plurality of parts form a sequence, and wherein each next part in the sequence has a same set of characters as a prior part in the sequence and an additional character of the candidate;
    determining a plurality of string distances, each string distance being between a respective one of the plurality of parts and the input pattern;
    identifying a part from among the plurality of parts that has a best string distance from among the plurality of string distances; and
    adding the candidate to a list for output by the electronic device based on a comparison between the best string distance and a string distance threshold.

17. A computer-implemented method as claimed in claim 16, comprising identifying a first set of corner points in said continuous input pattern; and
  identifying a second set of corner points in a modelled input pattern.

18. A computer-implemented method as claimed in claim 17, further comprising applying a pattern matching algorithm to determine a correlation between the first and second sets of corner points.

19. A computer-implemented method as claimed in claim 18, wherein a weighting is applied to each corner point in said first set and/or said second set based on an included angle and/or curvature at each corner point.

20. A computer-implemented method as claimed in claim 16, wherein said pattern matching algorithm is a dynamic time warping algorithm.

21. A computer-implemented method as claimed in claim 16, wherein the plurality of pre-defined non-overlapping groups comprises a plurality of rows of the virtual keyboard.

22. A computer-implemented method as claimed in claim 16, wherein the one or more candidates each comprise a word, a phrase, or a sentence.

23. A computing device comprising an electronic processor configured to execute instructions to:
  display a virtual keyboard comprising a plurality of keys arranged in a plurality of pre-defined non-overlapping groups on a display screen, each pre-defined non-overlapping group allocated an associated one of a plurality of unique identifier codes, one or more characters being associated with each of said keys;

detect an input pattern generated by a user on the display screen over the plurality of pre-defined non-overlapping groups of the virtual keyboard;

encode the input pattern by generating a sequence of the plurality of unique identifier codes corresponding to the input pattern over the plurality of pre-defined non-overlapping groups;

identify one or more candidates to be input into the electronic device based on the encoded input pattern; and for a candidate of the one or more candidates:

identify a plurality of parts of the candidate that have associated path lengths that fall within an upper path length threshold and a lower path length threshold, wherein the plurality of parts form a sequence, and wherein each next part in the sequence has a same set of characters as a prior part in the sequence and an additional character of the candidate;

determine a plurality of string distances, each string distance being between a respective one of the plurality of parts and the input pattern;

identify a part from among the plurality of parts that has a best string distance from among the plurality of string distances; and add the candidate to a list for output by the electronic device based on a comparison between the best string distance and a string distance threshold.

24. A computing device as claimed in claim 23, wherein the plurality of pre-defined non-overlapping groups comprises a plurality of rows of the virtual keyboard.

25. A computing device as claimed in claim 23, wherein the one or more candidates each comprise a word, a phrase, or a sentence.

* * * * *